US012034710B2

(12) United States Patent
Moore

(10) Patent No.: US 12,034,710 B2
(45) Date of Patent: Jul. 9, 2024

(54) EFFICIENT SSL/TLS PROXY

(71) Applicant: Centripetal Networks, LLC, Portsmouth, NH (US)

(72) Inventor: Sean Moore, Hollis, NH (US)

(73) Assignee: Centripetal Networks, LLC, Portsmouth, NH (US)

( * ) Notice: Subject to any disclaimer, the term of this patent is extended or adjusted under 35 U.S.C. 154(b) by 0 days.

(21) Appl. No.: 17/556,318

(22) Filed: Dec. 20, 2021

(65) Prior Publication Data

US 2022/0116369 A1 Apr. 14, 2022

Related U.S. Application Data

(63) Continuation of application No. 16/356,421, filed on Mar. 18, 2019, now Pat. No. 11,233,777, which is a continuation of application No. 16/039,896, filed on Jul. 19, 2018, now Pat. No. 10,284,526.

(60) Provisional application No. 62/536,254, filed on Jul. 24, 2017.

(51) Int. Cl.
*H04L 29/06* (2006.01)
*H04L 9/40* (2022.01)
*H04L 12/26* (2006.01)

(52) U.S. Cl.
CPC ...... *H04L 63/0464* (2013.01); *H04L 63/0281* (2013.01); *H04L 63/166* (2013.01)

(58) Field of Classification Search
CPC  H04L 63/0464; H04L 63/0281; H04L 63/166
USPC ........................................................ 713/153
See application file for complete search history.

(56) References Cited

U.S. PATENT DOCUMENTS

| | | | |
|---|---|---|---|
| 5,835,726 A | 11/1998 | Shwed et al. | |
| 6,098,172 A | 8/2000 | Coss et al. | |
| 6,147,976 A | 11/2000 | Shand et al. | |
| 6,226,372 B1 | 5/2001 | Beebe et al. | |
| 6,279,113 B1 | 8/2001 | Vaidya | |
| 6,317,837 B1 | 11/2001 | Kenworthy | |

(Continued)

FOREIGN PATENT DOCUMENTS

| | | | |
|---|---|---|---|
| AU | 2005328336 B2 | 9/2011 | |
| AU | 2006230171 B2 | 6/2012 | |

(Continued)

OTHER PUBLICATIONS

Jul. 10, 2023, Patent Owner's Response, Case IPR2022-01525, U.S. Pat. No. 10,284,526, 72 pages.

(Continued)

*Primary Examiner* — Haresh N Patel
(74) *Attorney, Agent, or Firm* — Banner & Witcoff, Ltd.

(57) ABSTRACT

Systems, devices, and methods are disclosed for selectively decrypting SSL/TLS communications. Contents of the decrypted communications that may result in some action; for example, to terminate the communications, or to log and store the plaintext packets of the communications for subsequent content inspection and analysis. A SSL/TLS proxy may examine the information contained in the TLS handshake protocol and/or examine other information associated with the connection. Based on the examination, a proxy may determine whether or not to decrypt the encrypted communications. The proxy may take additional actions based on content inspection.

37 Claims, 9 Drawing Sheets

(56) References Cited

U.S. PATENT DOCUMENTS

| | | |
|---|---|---|
| 6,484,261 B1 | 11/2002 | Wiegel |
| 6,611,875 B1 | 8/2003 | Chopra et al. |
| 6,615,357 B1 | 9/2003 | Boden et al. |
| 6,662,235 B1 | 12/2003 | Callis et al. |
| 6,678,827 B1 | 1/2004 | Rothermel et al. |
| 6,826,694 B1 | 11/2004 | Dutta et al. |
| 6,907,042 B1 | 6/2005 | Oguchi |
| 6,922,417 B2 | 7/2005 | Vanlint |
| 7,089,581 B1 | 8/2006 | Nagai et al. |
| 7,095,716 B1 | 8/2006 | Ke et al. |
| 7,107,613 B1 | 9/2006 | Chen et al. |
| 7,143,438 B1 | 11/2006 | Coss et al. |
| 7,152,240 B1 | 12/2006 | Green et al. |
| 7,215,637 B1 | 5/2007 | Ferguson et al. |
| 7,225,269 B2 | 5/2007 | Watanabe |
| 7,225,468 B2 | 5/2007 | Waisman et al. |
| 7,227,842 B1 | 6/2007 | Ji et al. |
| 7,237,258 B1 | 6/2007 | Pantuso et al. |
| 7,237,267 B2 | 6/2007 | Rayes et al. |
| 7,263,099 B1 | 8/2007 | Woo et al. |
| 7,296,288 B1 | 11/2007 | Hill et al. |
| 7,299,353 B2 | 11/2007 | Le Pennec et al. |
| 7,331,061 B1 | 2/2008 | Ramsey et al. |
| 7,370,358 B2 | 5/2008 | Ghanea-Hercock |
| 7,478,429 B2 | 1/2009 | Lyon |
| 7,539,186 B2 | 5/2009 | Aerrabotu et al. |
| 7,610,621 B2 | 10/2009 | Turley et al. |
| 7,684,400 B2 | 3/2010 | Govindarajan et al. |
| 7,706,358 B2 | 4/2010 | Kitada |
| 7,710,885 B2 | 5/2010 | Ilnicki et al. |
| 7,721,084 B2 | 5/2010 | Salminen et al. |
| 7,778,194 B1* | 8/2010 | Yung .................. H04L 43/00 709/224 |
| 7,792,775 B2 | 9/2010 | Matsuda |
| 7,814,158 B2 | 10/2010 | Malik |
| 7,814,546 B1 | 10/2010 | Strayer et al. |
| 7,818,794 B2 | 10/2010 | Wittman |
| 7,913,303 B1 | 3/2011 | Rouland et al. |
| 7,953,014 B2 | 5/2011 | Toda et al. |
| 7,954,143 B2 | 5/2011 | Aaron |
| 7,962,606 B2 | 6/2011 | Barron et al. |
| 7,966,654 B2 | 6/2011 | Crawford |
| 7,990,911 B2 | 8/2011 | Sutivong et al. |
| 8,004,994 B1 | 8/2011 | Darisi et al. |
| 8,009,566 B2 | 8/2011 | Zuk et al. |
| 8,037,517 B2 | 10/2011 | Fulp et al. |
| 8,042,149 B2 | 10/2011 | Judge |
| 8,042,167 B2 | 10/2011 | Fulp et al. |
| 8,117,655 B2 | 2/2012 | Spielman |
| 8,176,561 B1 | 5/2012 | Hurst et al. |
| 8,306,994 B2 | 11/2012 | Kenworthy |
| 8,307,029 B2 | 11/2012 | Davis et al. |
| 8,331,234 B1 | 12/2012 | Newton et al. |
| 8,413,238 B1 | 4/2013 | Sutton |
| 8,438,270 B2 | 5/2013 | Nappier et al. |
| 8,495,725 B2 | 7/2013 | Ahn |
| 8,510,821 B1 | 8/2013 | Brandwine et al. |
| 8,654,626 B2 | 2/2014 | Ichino et al. |
| 8,689,107 B2 | 4/2014 | Dong et al. |
| 8,694,779 B2 | 4/2014 | Gagnon et al. |
| 8,726,379 B1 | 5/2014 | Stiansen et al. |
| 8,789,135 B1 | 7/2014 | Pani |
| 8,806,638 B1 | 8/2014 | Mani |
| 8,832,832 B1 | 9/2014 | Visbal |
| 8,856,926 B2 | 10/2014 | Narayanaswamy et al. |
| 8,923,181 B2 | 12/2014 | Yao et al. |
| 8,930,690 B2 | 1/2015 | Zuo et al. |
| 8,935,785 B2 | 1/2015 | Pandrangi |
| 8,955,128 B1 | 2/2015 | Trama et al. |
| 9,009,461 B2 | 4/2015 | Martini |
| 9,021,575 B2 | 4/2015 | Martini |
| 9,077,667 B2 | 7/2015 | Sridhar |
| 9,094,445 B2 | 7/2015 | Moore et al. |
| 9,100,352 B2 | 8/2015 | Zha et al. |
| 9,124,552 B2 | 9/2015 | Moore |
| 9,137,205 B2 | 9/2015 | Rogers et al. |
| 9,154,446 B2 | 10/2015 | Gemelli et al. |
| 9,160,713 B2 | 10/2015 | Moore |
| 9,172,627 B2 | 10/2015 | Kjendal et al. |
| 9,282,017 B2 | 3/2016 | Iizuka et al. |
| 9,342,691 B2 | 5/2016 | Maestas |
| 9,361,085 B2 | 6/2016 | El-Gillani |
| 9,380,489 B2 | 6/2016 | Kotecha et al. |
| 9,407,602 B2 | 8/2016 | Feghali et al. |
| 9,419,942 B1 | 8/2016 | Buruganahalli et al. |
| 9,531,672 B1 | 12/2016 | Li et al. |
| 9,544,135 B2 | 1/2017 | Andoni |
| 9,608,879 B2 | 3/2017 | Cartwright et al. |
| 9,614,689 B2 | 4/2017 | Cook et al. |
| 9,686,193 B2 | 6/2017 | Moore |
| 10,084,712 B1* | 9/2018 | Li .................. H04L 43/026 |
| 10,097,510 B2 | 10/2018 | Agrawal et al. |
| 10,142,301 B1 | 11/2018 | Sharifi Mehr et al. |
| 10,250,618 B2 | 4/2019 | Bhogavilli et al. |
| 10,284,526 B2* | 5/2019 | Moore ............... H04L 47/2433 |
| 10,469,453 B2 | 11/2019 | Reddy et al. |
| 10,476,673 B2 | 11/2019 | Higgins et al. |
| 11,233,777 B2* | 1/2022 | Moore ............... H04L 63/0281 |
| 2001/0039579 A1 | 11/2001 | Trcka et al. |
| 2001/0039624 A1 | 11/2001 | Kellum |
| 2002/0015387 A1 | 2/2002 | Houh |
| 2002/0016858 A1 | 2/2002 | Sawada et al. |
| 2002/0038339 A1 | 3/2002 | Xu |
| 2002/0049899 A1 | 4/2002 | Kenworthy |
| 2002/0083345 A1 | 6/2002 | Halliday et al. |
| 2002/0112188 A1 | 8/2002 | Syvanne |
| 2002/0152209 A1 | 10/2002 | Merugu et al. |
| 2002/0164962 A1 | 11/2002 | Mankins et al. |
| 2002/0165949 A1 | 11/2002 | Na et al. |
| 2002/0186683 A1 | 12/2002 | Buck et al. |
| 2002/0198981 A1 | 12/2002 | Corl et al. |
| 2003/0005122 A1 | 1/2003 | Freimuth et al. |
| 2003/0014665 A1 | 1/2003 | Anderson et al. |
| 2003/0018591 A1 | 1/2003 | Komisky |
| 2003/0035370 A1 | 2/2003 | Brustoloni |
| 2003/0051026 A1 | 3/2003 | Carter et al. |
| 2003/0088787 A1* | 5/2003 | Egevang ............ H04L 63/0428 726/7 |
| 2003/0097590 A1 | 5/2003 | Syvanne |
| 2003/0105976 A1 | 6/2003 | Copeland |
| 2003/0120622 A1 | 6/2003 | Nurmela et al. |
| 2003/0123456 A1 | 7/2003 | Denz et al. |
| 2003/0142681 A1 | 7/2003 | Chen et al. |
| 2003/0145225 A1 | 7/2003 | Bruton et al. |
| 2003/0154297 A1 | 8/2003 | Suzuki et al. |
| 2003/0154399 A1 | 8/2003 | Zuk et al. |
| 2003/0188192 A1 | 10/2003 | Tang et al. |
| 2003/0212900 A1 | 11/2003 | Liu et al. |
| 2003/0220940 A1 | 11/2003 | Futoransky et al. |
| 2004/0010712 A1 | 1/2004 | Hui et al. |
| 2004/0015719 A1 | 1/2004 | Lee et al. |
| 2004/0015725 A1 | 1/2004 | Boneh et al. |
| 2004/0073655 A1 | 4/2004 | Kan et al. |
| 2004/0088542 A1 | 5/2004 | Daude et al. |
| 2004/0093513 A1 | 5/2004 | Cantrell et al. |
| 2004/0098511 A1 | 5/2004 | Lin et al. |
| 2004/0123220 A1 | 6/2004 | Johnson et al. |
| 2004/0131056 A1 | 7/2004 | Dark |
| 2004/0148520 A1 | 7/2004 | Talpade et al. |
| 2004/0151155 A1 | 8/2004 | Jouppi |
| 2004/0172529 A1 | 9/2004 | Culbert |
| 2004/0172557 A1 | 9/2004 | Nakae et al. |
| 2004/0177139 A1 | 9/2004 | Schuba et al. |
| 2004/0181690 A1 | 9/2004 | Rothermel et al. |
| 2004/0193943 A1 | 9/2004 | Angelino et al. |
| 2004/0199629 A1 | 10/2004 | Bomer et al. |
| 2004/0205360 A1 | 10/2004 | Norton et al. |
| 2004/0250124 A1 | 12/2004 | Chesla et al. |
| 2005/0010765 A1 | 1/2005 | Swander et al. |
| 2005/0024189 A1 | 2/2005 | Weber |
| 2005/0071650 A1 | 3/2005 | Jo et al. |
| 2005/0076227 A1 | 4/2005 | Kang et al. |
| 2005/0108557 A1 | 5/2005 | Kayo et al. |
| 2005/0114704 A1 | 5/2005 | Swander |

(56) References Cited

U.S. PATENT DOCUMENTS

| | | |
|---|---|---|
| 2005/0117576 A1 | 6/2005 | McDysan et al. |
| 2005/0125697 A1 | 6/2005 | Tahara |
| 2005/0138204 A1 | 6/2005 | Iyer et al. |
| 2005/0138353 A1 | 6/2005 | Spies et al. |
| 2005/0141537 A1 | 6/2005 | Kumar et al. |
| 2005/0183140 A1 | 8/2005 | Goddard |
| 2005/0229246 A1 | 10/2005 | Rajagopal et al. |
| 2005/0249214 A1 | 11/2005 | Peng |
| 2005/0251570 A1 | 11/2005 | Heasman et al. |
| 2005/0283823 A1 | 12/2005 | Okajo et al. |
| 2005/0286522 A1 | 12/2005 | Paddon et al. |
| 2006/0031928 A1 | 2/2006 | Conley et al. |
| 2006/0048142 A1 | 3/2006 | Roese et al. |
| 2006/0053491 A1 | 3/2006 | Khuti et al. |
| 2006/0070122 A1 | 3/2006 | Bellovin |
| 2006/0080733 A1 | 4/2006 | Khosmood et al. |
| 2006/0085849 A1 | 4/2006 | Culbert |
| 2006/0104202 A1 | 5/2006 | Reiner |
| 2006/0114899 A1 | 6/2006 | Toumura et al. |
| 2006/0133377 A1 | 6/2006 | Jain |
| 2006/0136987 A1 | 6/2006 | Okuda |
| 2006/0137009 A1 | 6/2006 | Chesla |
| 2006/0146879 A1 | 7/2006 | Anthias et al. |
| 2006/0159028 A1 | 7/2006 | Curran-Gray et al. |
| 2006/0195896 A1 | 8/2006 | Fulp et al. |
| 2006/0212572 A1 | 9/2006 | Afek et al. |
| 2006/0248580 A1 | 11/2006 | Fulp et al. |
| 2006/0262798 A1 | 11/2006 | Joshi et al. |
| 2007/0083924 A1 | 4/2007 | Lu |
| 2007/0118894 A1 | 5/2007 | Bhatia |
| 2007/0147380 A1 | 6/2007 | Ormazabal et al. |
| 2007/0211644 A1 | 9/2007 | Ottamalika et al. |
| 2007/0240208 A1 | 10/2007 | Yu et al. |
| 2007/0242683 A1* | 10/2007 | Pelletier ................ H04W 28/06 370/401 |
| 2007/0242703 A1* | 10/2007 | Pelletier ................ H04W 28/06 370/395.52 |
| 2007/0291789 A1 | 12/2007 | Kutt et al. |
| 2008/0005795 A1 | 1/2008 | Acharya et al. |
| 2008/0028467 A1 | 1/2008 | Kommareddy et al. |
| 2008/0043739 A1 | 2/2008 | Suh et al. |
| 2008/0072307 A1 | 3/2008 | Maes |
| 2008/0077705 A1 | 3/2008 | Li et al. |
| 2008/0080493 A1 | 4/2008 | Weintraub et al. |
| 2008/0086435 A1 | 4/2008 | Chesla |
| 2008/0101234 A1 | 5/2008 | Nakil et al. |
| 2008/0163333 A1 | 7/2008 | Kasralikar |
| 2008/0229415 A1 | 9/2008 | Kapoor et al. |
| 2008/0235755 A1 | 9/2008 | Blaisdell et al. |
| 2008/0279196 A1 | 11/2008 | Friskney et al. |
| 2008/0301765 A1 | 12/2008 | Nicol et al. |
| 2009/0007219 A1 | 1/2009 | Abzarian et al. |
| 2009/0028160 A1 | 1/2009 | Eswaran et al. |
| 2009/0138938 A1 | 5/2009 | Harrison et al. |
| 2009/0144819 A1 | 6/2009 | Babbar et al. |
| 2009/0150972 A1 | 6/2009 | Moon et al. |
| 2009/0172800 A1 | 7/2009 | Wool |
| 2009/0222877 A1 | 9/2009 | Diehl et al. |
| 2009/0240698 A1 | 9/2009 | Shukla et al. |
| 2009/0262723 A1 | 10/2009 | Pelletier et al. |
| 2009/0262741 A1 | 10/2009 | Jungck et al. |
| 2009/0300759 A1 | 12/2009 | Wang et al. |
| 2009/0328219 A1 | 12/2009 | Narayanaswamy |
| 2010/0011433 A1 | 1/2010 | Harrison et al. |
| 2010/0011434 A1 | 1/2010 | Kay |
| 2010/0082811 A1 | 4/2010 | Van Der Merwe et al. |
| 2010/0095367 A1 | 4/2010 | Narayanaswamy |
| 2010/0107240 A1 | 4/2010 | Thaler et al. |
| 2010/0115621 A1 | 5/2010 | Staniford et al. |
| 2010/0132027 A1 | 5/2010 | Ou |
| 2010/0195503 A1 | 8/2010 | Raleigh |
| 2010/0199346 A1 | 8/2010 | Ling et al. |
| 2010/0211678 A1 | 8/2010 | McDysan et al. |
| 2010/0232445 A1 | 9/2010 | Bellovin |
| 2010/0242098 A1 | 9/2010 | Kenworthy |
| 2010/0268799 A1 | 10/2010 | Maestas |
| 2010/0268935 A1* | 10/2010 | Rodgers ................ H04L 63/164 713/153 |
| 2010/0296441 A1 | 11/2010 | Barkan |
| 2010/0303240 A1 | 12/2010 | Beachem et al. |
| 2011/0055916 A1 | 3/2011 | Ahn |
| 2011/0055923 A1 | 3/2011 | Thomas |
| 2011/0088092 A1 | 4/2011 | Nguyen et al. |
| 2011/0141900 A1 | 6/2011 | Jayawardena et al. |
| 2011/0154470 A1 | 6/2011 | Grimes et al. |
| 2011/0185055 A1 | 7/2011 | Nappier et al. |
| 2011/0191467 A1 | 8/2011 | Imbimbo et al. |
| 2011/0214157 A1 | 9/2011 | Korsunsky et al. |
| 2011/0270956 A1 | 11/2011 | McDysan et al. |
| 2011/0277034 A1 | 11/2011 | Hanson |
| 2011/0305160 A1 | 12/2011 | Green et al. |
| 2012/0023576 A1 | 1/2012 | Sorensen et al. |
| 2012/0084866 A1 | 4/2012 | Stolfo |
| 2012/0106354 A1 | 5/2012 | Pleshek et al. |
| 2012/0110656 A1 | 5/2012 | Santos et al. |
| 2012/0113987 A1 | 5/2012 | Riddoch et al. |
| 2012/0143650 A1 | 6/2012 | Crowley et al. |
| 2012/0240135 A1 | 9/2012 | Risbood et al. |
| 2012/0240185 A1 | 9/2012 | Kapoor et al. |
| 2012/0264443 A1 | 10/2012 | Ng et al. |
| 2012/0290829 A1 | 11/2012 | Altman |
| 2012/0314617 A1 | 12/2012 | Erichsen et al. |
| 2012/0331543 A1 | 12/2012 | Bostrom et al. |
| 2013/0007257 A1 | 1/2013 | Ramaraj et al. |
| 2013/0047020 A1 | 2/2013 | Hershko et al. |
| 2013/0059527 A1 | 3/2013 | Hasesaka et al. |
| 2013/0061294 A1 | 3/2013 | Kenworthy |
| 2013/0104236 A1 | 4/2013 | Ray et al. |
| 2013/0117852 A1 | 5/2013 | Stute |
| 2013/0254766 A1 | 9/2013 | Zuo et al. |
| 2013/0262655 A1 | 10/2013 | Desch nes et al. |
| 2013/0291100 A1 | 10/2013 | Ganapathy et al. |
| 2013/0305311 A1 | 11/2013 | Puttaswamy Naga et al. |
| 2014/0075510 A1 | 3/2014 | Sonoda et al. |
| 2014/0082204 A1 | 3/2014 | Shankar et al. |
| 2014/0082730 A1 | 3/2014 | Vashist et al. |
| 2014/0115654 A1 | 4/2014 | Rogers et al. |
| 2014/0140213 A1 | 5/2014 | Raleigh et al. |
| 2014/0150051 A1 | 5/2014 | Bharali et al. |
| 2014/0201123 A1 | 7/2014 | Ahn et al. |
| 2014/0215561 A1 | 7/2014 | Roberson et al. |
| 2014/0215574 A1 | 7/2014 | Erb et al. |
| 2014/0245423 A1 | 8/2014 | Lee |
| 2014/0259168 A1 | 9/2014 | McNamee et al. |
| 2014/0259170 A1 | 9/2014 | Amsler |
| 2014/0280778 A1 | 9/2014 | Paxton |
| 2014/0281030 A1 | 9/2014 | Cui et al. |
| 2014/0283004 A1 | 9/2014 | Moore |
| 2014/0283030 A1 | 9/2014 | Moore et al. |
| 2014/0304498 A1* | 10/2014 | Gonuguntla ........ H04L 63/0281 713/151 |
| 2014/0304499 A1* | 10/2014 | Gopinath ............. H04L 63/168 713/151 |
| 2014/0317397 A1 | 10/2014 | Martini |
| 2014/0317737 A1 | 10/2014 | Shin et al. |
| 2014/0321290 A1 | 10/2014 | Jin et al. |
| 2014/0337613 A1 | 11/2014 | Martini |
| 2014/0344326 A1* | 11/2014 | Kamath ................ G06F 9/5027 709/203 |
| 2014/0365372 A1 | 12/2014 | Ross et al. |
| 2014/0366132 A1 | 12/2014 | Stiansen et al. |
| 2015/0033336 A1 | 1/2015 | Wang et al. |
| 2015/0052601 A1 | 2/2015 | White et al. |
| 2015/0106930 A1 | 4/2015 | Honda et al. |
| 2015/0121449 A1 | 4/2015 | Cp et al. |
| 2015/0128274 A1 | 5/2015 | Giokas |
| 2015/0135325 A1 | 5/2015 | Stevens et al. |
| 2015/0143107 A1 | 5/2015 | Kale et al. |
| 2015/0188823 A1* | 7/2015 | Williams ............ H04L 12/4633 370/235 |
| 2015/0188943 A1* | 7/2015 | Williams ............ H04L 12/4633 713/151 |
| 2015/0207809 A1 | 7/2015 | Macaulay |
| 2015/0237012 A1 | 8/2015 | Moore |

(56) References Cited

U.S. PATENT DOCUMENTS

| | | | |
|---|---|---|---|
| 2015/0244734 A1 | 8/2015 | Olson et al. | |
| 2015/0256431 A1 | 9/2015 | Buchanan et al. | |
| 2015/0304354 A1 | 10/2015 | Rogers et al. | |
| 2015/0334125 A1 | 11/2015 | Bartos et al. | |
| 2015/0341383 A1* | 11/2015 | Reddy | H04L 63/0876 726/22 |
| 2015/0341389 A1 | 11/2015 | Kurakami | |
| 2015/0347246 A1 | 12/2015 | Matsui et al. | |
| 2015/0350229 A1 | 12/2015 | Mitchell | |
| 2015/0372977 A1 | 12/2015 | Yin | |
| 2015/0373043 A1 | 12/2015 | Wang et al. | |
| 2016/0020968 A1 | 1/2016 | Aumann et al. | |
| 2016/0028751 A1 | 1/2016 | Cruz Mota et al. | |
| 2016/0065611 A1 | 3/2016 | Fakeri-Tabrizi et al. | |
| 2016/0080316 A1 | 3/2016 | Gonzalez Pizarro et al. | |
| 2016/0094418 A1 | 3/2016 | Raney | |
| 2016/0112443 A1 | 4/2016 | Grossman et al. | |
| 2016/0119365 A1 | 4/2016 | Barel | |
| 2016/0127417 A1 | 5/2016 | Janssen | |
| 2016/0173446 A1 | 6/2016 | Nantel | |
| 2016/0205069 A1 | 7/2016 | Blocher et al. | |
| 2016/0219065 A1 | 7/2016 | Dasgupta et al. | |
| 2016/0285706 A1 | 9/2016 | Rao | |
| 2016/0294870 A1 | 10/2016 | Banerjee et al. | |
| 2016/0330301 A1* | 11/2016 | Raindel | H04L 63/0485 |
| 2016/0344708 A1 | 11/2016 | Kawai et al. | |
| 2016/0366099 A1 | 12/2016 | Jordan | |
| 2017/0272469 A1 | 9/2017 | Kraemer et al. | |
| 2017/0331789 A1* | 11/2017 | Kumar | H04L 63/0272 |
| 2018/0248909 A1* | 8/2018 | Bharrat | H04L 63/1458 |
| 2018/0295134 A1* | 10/2018 | Gupta | H04L 67/56 |
| 2018/0351970 A1* | 12/2018 | Majumder | H04L 63/061 |
| 2019/0028439 A1* | 1/2019 | Moore | H04L 63/0281 |
| 2020/0053064 A1* | 2/2020 | Oprisan | H04L 69/16 |

FOREIGN PATENT DOCUMENTS

| | | | |
|---|---|---|---|
| CA | 2600236 A1 | 10/2006 | |
| EP | 1006701 A2 | 6/2000 | |
| EP | 1313290 A1 | 5/2003 | |
| EP | 1484884 A2 | 12/2004 | |
| EP | 1677484 A2 | 7/2006 | |
| EP | 2385676 A1 | 11/2011 | |
| EP | 2482522 A1 | 8/2012 | |
| EP | 2498442 A1 | 9/2012 | |
| EP | 1864226 B1 | 5/2013 | |
| EP | 2528299 B1 | 8/2019 | |
| EP | 3361695 B1 | 3/2020 | |
| KR | 20010079361 A | 8/2001 | |
| WO | 2005046145 A1 | 5/2005 | |
| WO | 2006093557 A2 | 9/2006 | |
| WO | 2006105093 A2 | 10/2006 | |
| WO | 2007/023465 A1 | 3/2007 | |
| WO | 2007109541 A2 | 9/2007 | |
| WO | 2011038420 A2 | 3/2011 | |
| WO | 2012146265 A1 | 11/2012 | |
| WO | 2014/001773 A1 | 1/2014 | |

OTHER PUBLICATIONS

Exhibit 2001 as cited in Patent Owner's Response dated Jul. 10, 2023, Case IPR2022-01525, U.S. Pat. No. 10,284,526, Declaration of Michael T. Goodrich, Ph.D. In Support of Patent Owner's Preliminary Response with Appendix A, dated Jan. 19, 2023, Case IPR2022-01525, U.S. Pat. No. 10,284,526 B2, 74 pages.

Exhibit 2003 as cited in Patent Owner's Response dated Jul. 10, 2023, Case IPR2022-01525, U.S. Pat. No. 10,284,526, Deposition of Dr. Atul Prakash, dated Jun. 28, 2023, 34 pages.

Exhibit 2002 as cited in Patent Owner's Response dated Jul. 10, 2023, Case IPR2022-01525, U.S. Pat. No. 10,284,526, Declaration of Dr. Michael T. Goodrich in Support of Patent Owner's Response with Appendix A, dated Jul. 10, 2023, Case IPR2022-01525, U.S. Pat. No. 10,284,526, 105 pages.

Exhibit 2004 as cited in Patent Owner's Response dated Jul. 10, 2023, Case IPR2022-01525, U.S. Pat. No. 10,284,526, Excerpts from Microsoft Computer Dictionary (5th ed. 2002), 5 pages.

Aug. 8, 2023, Initial Determination on Violation of Section 337 and Recommended Determination on Remedy and Bond, Inv. No. 337-TA-1314, 285 pages.

Dec. 5, 2023 U.S. Notice of Commission Determination to Review in Part and, On Review, To Affirm a Final Initial Determination Finding No Violatin of Section 337; Termnination of the Investigation, Investigation No. 337-TA-1314, 4 pages.

Sep. 9, 2022 U.S. Declaration of Dr. Atul Prakash, Ex. 1002, PTAB Case No. Unassigned, U.S. Pat. No. 10,284,526B2, 230 pages.

Jan. 20, 2023 U.S. Patent Owner's Preliminary Response, Case IPR2022-01525, U.S. Pat. No. 10,284,526, 57 pages.

D. Comer, "Analysis of a Heuristic for Full Trie Minimization", ACM Transactions on Database Systems, 6(3): 513-537, Sep. 1981.

D. Decasper et al., "Router Plugins: A Software Architecture for Next-Generation Routers", IEEE/ACM Transactions on Networking, 8(1): Feb. 2000.

D. Eppstein et al., "Internet Packet Filter Management and Rectangle Geometry", Proceedings of the Symposium on Discrete Algorithms, 827-835, 2001.

E. Al-Shaer et al., "Firewall Policy Advisor for Anomaly Discovery and Rule Editing", Proceedings of the IFIP/IEEE International Symposium on Integrated Network Management, 2003.

E. Al-Shaer et al., "Modeling and Management of Firewall Policies", IEEE Transactions on Network and Service Management, 1(1): 2004.

E. Fulp et al., "Network Firewall Policy Tries", Technical Report, Computer Science Department, Wake Forest University, 2004.

E. Fulp, "Optimization of Network Firewall Policies Using Ordered Sets and Directed Acyclical Graphs", Technical Report, Computer Scient Department, Wake Forest University, Jan. 2004.

E. Fulp, "Preventing Denial of Service Attacks on Quality of Service", Proceedings of the 2001 DARPA Information Survivability Conference and Exposition II, 2001.

E.L. Lawler, "Sequencing Jobs to Minimize Total Weighted Completion Time Subject to Precedence Constraints", Annals of Discrete Mathematics, 2: 75-90, 1978.

E.W. Fulp, "Firewall Architectures for High Speed Networks", U.S. Department of Energy Grant Application, Funded Sep. 2003.

Fulp, "Trie-Based Policy Representations for Network Firewalls," Proceedings of the IEEE International Symposium on Computer Communications (2005).

Fulp, Errin: "CV: Errin Fulp," XP002618346, www.cs.wfu.edu/fulp/ewfPub.html, pp. 1-5 (Copyright 2010).

G. Brightwell et al., "Counting Linear Extensions is #P-Complete", Proceedings of the Twenty-Third Annual ACM Symposium on Theory of Computing, 1991.

G.V. Rooij, "Real Stateful TCP Packet Filtering in IP Filter", Proceedings of the 10th USENIX Security Symposium, 2001.

Greenwald, Michael; "Designing an Academic Firewall: Policy, Practice, and Experience with SURF"; IEEE, Proceedings of SNDSS, 1996.

J. Xu et al., "Design and Evaluation of a High-Performance ATM Firewall Switch and Its Applications", IEEE Journal on Selected Areas in Communications, 17(6): 1190-1200, Jun. 1999.

J.K. Lenstra et al., "Complexity of Scheduling Under Precedence Constraints", Operations Research, 26(1): 22-35, 1978.

Kindervag, et al. "Build Security Into Your Network's DNA: The Zero Trust Network Architecture," Forrester Research Inc.; Nov. 5, 2010, pp. 1-26.

L. Qui et al., "Fast Firewall Implementations for Software and Hardware-Based Routers", Proceedings of ACM Sigmetrics, Jun. 2001.

Lee et al., "Development Framework for Firewall Processors," IEEE, pp. 352-355 (2002).

M. Al-Suwaiyel et al., "Algorithms for Trie Compaction", ACM Transactions on Database Systems, 9(2): 243-263, Jun. 1984.

M. Christiansen et al., "Using IDDs for Packet Filtering," Technical Report, BRICS, Oct. 2002.

M. Degermark et al., "Small Forwarding Tables for Fast Routing Lookups", Proceedings of ACM SIGCOMM, 4-13, 1997.

(56) References Cited

OTHER PUBLICATIONS

Mizuno et al., A New Remote Configurable Firewall System for Home-use Gateways, Jan. 2005. Second IEEE Consumer Communications and Networking Conference, pp. 599-601.
Moore, S, "SBIR Case Study: Centripetal Networks: How CNI Leveraged DHS S&T SBIR Funding to Launch a Successful Cyber Security Company," 2012 Principal Investigators' Meeting, Cyber Security Division, Oct. 10, 2014.
O. Paul et al., "A full Bandwidth ATM Firewall", Proceedings of the 6th European Symposium on Research in Computer Security ESORICS'2000, 2000.
P. Warkhede et al., "Fast Packet Classification for Two-Dimensional Conflict-Free Filters", Proceedings of IEEE INFOCOM, 1434-1443, 2001.
Palo Alto Networks; "Designing A Zero Trust Network With Next-Generation Firewalls"; pp. 1-10; last viewed on Oct. 21, 2012.
R. Funke et al., "Performance Evaluation of Firewalls in Gigabit-Networks", Proceedings of the Symposium on Performance Evaluation of Computer and Telecommunication Systems, 1999.
R. Rivest, "On Self-Organizing Sequential Search Heuristics", Communications of the ACM, 19(2): 1976.
R.L. Graham et al., "Optimization and Approximation in Deterministic Sequencing and Scheduling: A Survey", Annals of Discrete Mathematics, 5: 287-326, 1979.
Reumann, John; "Adaptive Packet Filters"; IEEE, 2001, Department of Electrical Engineering and Computer Science, The University of Michigan, Ann Arbor, MI.
S,M. Bellovin et al., "Network Firewalls", IEEE Communications Magazine, 50-57, 1994.
S. Goddard et al., "An Unavailability Analysis of Firewall Sandwich Configurations", Proceedings of the 6th IEEE Symposium on High Assurance Systems Engineering, 2001.
S. Suri et al., "Packet Filtering in High Speed Networks", Proceedings of the Symposium on Discrete Algorithms, 969-970, 1999.
Singh, Rajeev et al. "Detecting and Reducing the Denial of Service attacks in WLANs", Dec. 2011, World Congress on Information and Communication TEchnologies, pp. 968-973.
Statement Re: Related Application, dated Jul. 24, 2015.
Tarsa et al., "Balancing Trie-Based Policy representations for Network Firewalls," Department of Computer Science, Wake Forest University, pp. 1-6 (2006).
U. Ellermann et al., "Firewalls for ATM Networks", Proceedings of INFOSEC'COM, 1998.
V. Srinivasan et al., "Fast and Scalable Layer Four Switching", Proceedings of ACM SIGCOMM, 191-202, 1998.
V.P. Ranganath, "A Set-Based Approach to Packet Classification", Proceedings of the IASTED International Conference on Parallel and Distributed Computing and Systems, 889-894, 2003.
W.E. Leland et al., "On the Self-Similar Nature of Ethernet Traffic", IEEE Transactions on Networking, 2(1); 15, 1994.
W.E. Smith, "Various Optimizers for Single-Stage Productions", Naval Research Logistics Quarterly, 3: 59-66, 1956.
X. Gan et al., "LSMAC vs. LSNAT: Scalable Cluster-based Web servers", Journal of Networks, Software Tools, and Applications, 3(3): 175-185, 2000.
Jul. 27, 2018 U.S. Non-Final Office Action—U.S. Appl. No. 15/382,806.
Sourcefire 3D System User Guide, Version 4.10, Mar. 16, 2011, 2123 pages.
Jul. 11, 2018 U.S. Declaration of Kevin Jeffay, PhD in Support of Petition for Inter Partes Review of U.S. Pat. No. 9,565,213—IPR2018-01386.
Ylonen, et al., "The Secure Shell (SSH) Transport Layer Protocol," SSH Communication Security Corp, Newtork Working Group RFC 4253, Jan. 2006, 32 pages.
Jul. 20, 2018 U.S. Declaration of Dr. Stuart Staniford in Support of Petition for Inter Partes Review of U.S. Pat. No. 9,160,713—IPR2018-01437.
Jul. 20, 2018 U.S. Declaration of Dr. Stuart Staniford in Support of Petition for Inter Partes Review of U.S. Pat. No. 9,124,552—IPR2018-01436.
Jul. 26, 2018 U.S. Declaration of Kevin Jeffay, PhD in Support of Second Petition for Inter Partes Review of U.S. Pat. No. 9,137,205—IPR2018-01444.
Nichols, et al., "Definition of the Differentiated Services Field (DS Field) in the IPv4 and IPv6 Headers," Network Working Group RFC 2474, Dec. 1998, 20 pages.
Jul. 26, 2018 U.S. Declaration of Kevin Jeffay, PhD in Support of First Petition for Inter Partes Review of U.S. Pat. No. 9,137,205—IPR2018-01443.
Perkins, "IP Encapsulation with IP," Network Working Group RFC 2003, Oct. 1996, 14 pages.
Jul. 12, 2018 U.S. Petition for Inter Partes Review of U.S. Pat. No. 9,565,213—IPR2018-01386.
Jul. 20, 2018 U.S. Petition for Inter Partes Review of U.S. Pat. No. 9,160,713—IPR2018-01437.
Jul. 20, 2018 U.S. Petition for Inter Partes Review of U.S. Pat. No. 9,124,552—IPR2018-01436.
Blake, et al., "An Architecture for Differentiated Services," Network Working Group RFC 2475, Dec. 1998, 36 pages.
Jul. 27, 2018 U.S. Second Petition for Inter Partes Review of U.S. Pat. No. 9,137,205—IPR2018-01444.
Jul. 27, 2018 U.S. First Petition for Inter Partes Review of U.S. Pat. No. 9,137,205—IPR2018-01443.
Aug. 9, 2018 U.S. Non-Final Office Action—U.S. Appl. No. 15/413,947.
Sep. 4, 2018 (WO) International Search Report and Written Opinion—App. PCT/US2018/041355.
Anonymous: "The Distribution of Malicious Domains," The DomainTools Report, 2016 Edition, Mar. 9, 2016 (Mar. 9, 2016), pp. 1-11, XP055502306, Retrieved from: https://www.domaintools.com/resources/white-papers/the-domaintools-report-the-distribution-of-malicious-domains.
Sep. 27, 2018 U.S. Non-Final Office Action—U.S. Appl. No. 15/614,956.
Oct. 4, 2018 U.S. Non-Final Office Action—U.S. Appl. No. 16/030,374.
Oct. 4, 2018 U.S. Notice of Allowance—U.S. Appl. No. 15/827,477.
"Cisco ACNS Softward Configuration Guide for Centrally Managed Deployments," Release 5.5. Text Part No. OL-9136-01, Cisco Systems, Inc., 2006, 944 pages.
Blake, et al., "An Architecture for Differentiated Services," also known as the Diffserv architecture, as defined in RFC 2475, Network Working Group, Dec. 1998, 36 pages.
Sep. 27, 2018 (WO) International Search Report and Written Opinion—App. PCT/US2018/043367.
"Examining SSL-encrypted Communications: Netronome SSL InspectorTM Solution Overview," Jan. 1, 2008, XP055036015, retrieved from <http://www.infosecurityproductsguide.com/technology/2008/Netronome_Examining_SSL-encrypted_Communications.pdf>, 8 pages.
Oct. 12, 2018 U.S. Non-Final Office Action—U.S. Appl. No. 16/039,896.
Aug. 29, 2018 (CA) Office Action—App. 2,888,935.
Nov. 14, 2018 U.S. Final Office Action—U.S. Appl. No. 14/745,207.
Dec. 18, 2018 U.S. Final Office Action—U.S. Appl. No. 15/610,995.
Feb. 6, 2019 U.S. Notice of Allowance and Fees Due—U.S. Appl. No. 16/039,896.
Aug. 10, 2018 U.S. Declaration of Kevin Jeffay, PhD in Support of Fourth Petition for Inter Partes Review of U.S. Pat. No. 9,137,205—IPR2018-01506.
Aug. 10, 2018 U.S. Fourth Petition for Inter Partes Review of U.S. Pat. No. 9,137,205—IPR2018-01506.
Aug. 3, 2018 U.S. Third Petition for Inter Partes Review of U.S. Pat. No. 9,137,205—IPR2018-01505.
Aug. 3, 2018 U.S. Declaration of Kevin Jeffay, PhD in Support of Third Petition for Inter Partes Review of U.S. Pat. No. 9,137,205—IPR2018-01505.
Aug. 3, 2018 U.S. Declaration of Kevin Jeffay, PhD in Support of Third Petition for Inter Partes Review of U.S. Pat. No. 9,560,077—IPR2018-01513.
Apr. 2, 2019 U.S. Decision—Institution of Inter Partes Review of U.S. Pat. No. 9,560,077—IPR 2018-01513.
Aug. 10, 2018 U.S. Petition for Inter Partes Review of Claims 1-20 of U.S. Pat. No. 9,560,077—IPR2018-01513.
Jun. 3, 2019 U.S. Final Office Action—U.S. Appl. No. 15/614,956.

(56) References Cited

OTHER PUBLICATIONS

May 23, 2019 U.S. Non-Final Office Action—U.S. Appl. No. 14/745,207.
May 24, 2019 U.S. Non-Final Office Action—U.S. Appl. No. 16/111,524.
Jun. 3, 2019 (EP) Communication pursuant to Article 94(3) EPC—Third Examination Report—App. 13765547.8.
Aug. 2, 2018 U.S. Notice of Allowance and Fees Due—U.S. Appl. No. 16/030,254.
Jul. 5, 2019 (EP) Extended European Search Report—App. 19179539.2.
Aug. 2, 2019 (CA) Office Action—App. 2,888,935.
Aug. 2, 2019 U.S. Non-Final Office Action—U.S. Appl. No. 16/448,969.
Aug. 16, 2019 (EP) Extended Search Report—App. 19170936.9.
Sep. 18, 2018 U.S. Petition for Inter Partes Review of U.S. Pat. No. 9,413,722—IPR 2018-01760.
Sep. 18, 2018 U.S. Declaration of Dr. Stuart Staniford in Support of Petition for Inter Partes Review of U.S. Pat. No. 9,413,722—IPR 2018-01760.
Sep. 3, 2019 U.S. Notice of Allowance and Fees Due—U.S. Appl. No. 16/518,190.
Aug. 19, 2019 (EP) Communication pursuant to Article 94(3) EPC—Examination Report—App. 14719415.3.
Oct. 11, 2019—U.S. Non-Final Office Action—U.S. Appl. No. 16/554,293.
Oct. 10, 2019—U.S. Notice of Allowance—U.S. Appl. No. 16/448,997.
Sep. 30, 2019 (WO) International Search Report and Written Opinion of International Searching Authority—Application No. PCT/US2019/040830.
Exhibit 1022—"Transmission Control Protocol," IETF RFC 793. J. Postel, ed., Sep. 1981.
Exhibit 1023—"Internet Protocol," IETF RFC 791, J. Postel, ed., Sep. 1981.
Nov. 3, 2023 U.S. Petitioner's Reply to Patent Owner Response, PTAB Case No. IPR2022-01525, U.S. Pat. No. 10,284,526 B2, 29 pages.
Exhibit 1014 as cited in Petitioner's Reply to Patent Owner Response, PTAB Case No. IPR2022-01525, Remote Proceedings of the Deposition of Michael Goodrich, Ph.D., Oct. 24, 2023, 35 pages.
Exhibit 1015 as cited in Petitioner's Reply to Patent Owner Response, PTAB Case No. IPR2022-01525, Initial Determination on Violation of Section 337 and Recommended Determination on Remedy and Bond, Inv. No. 337-TA-1314, Aug. 8, 2023, 10 pages.
Dec. 5, 2016—U.S. Notice of Allowance—U.S. Appl. No. 14/714,207.
Feb. 24, 2016—(AU) Office Action—App 2014228257.
Feb. 25, 2016—(AU) Office Action—App 2014249055.
Feb. 26, 2016—U.S. Non Final Office Action—U.S. Appl. No. 14/253,992.
Jan. 11, 2016—U.S. Non Final Rejection—U.S. Appl. No. 14/698,560.
Jan. 28, 2016—(WO) International Search Report and Written Opinion—App PCT/US2015/062691.
Jul. 11, 2016—(EP) Office Action—App 14720824.3.
Jul. 20, 2016—(AU) Office Action—App 2013335255.
Jul. 22, 2016—U.S. Office Action—U.S. Appl. No. 14/921,718.
Jun. 9, 2016—(WO) International Search Report—PCT/US2016/026339.
Jun. 14, 2016—U.S. Office Action—U.S. Appl. No. 14/625,486.
Jun. 16, 2016—(CA) Office Action—App 2,888,935.
May 6, 2016—U.S. Office Action—U.S. Appl. No. 14/714,207.
May 13, 2016—U.S. Office Action—U.S. Appl. No. 13/940,240.
Nov. 21, 2016—U.S. Office Action—U.S. Appl. No. 14/745,207.
Oct. 5, 2016—U.S. Notice of Allowance—U.S. Appl. No. 14/698,560.
Oct. 26, 2016—U.S. Office Action—U.S. Appl. No. 13/940,240.
Sep. 13, 2016—(CA) Office Action—App 2,902,206.
Sep. 14, 2016—(CA) Office Action—App 2,897,737.
Sep. 26, 2016—(CA) Office Action—App 2,902,158.
Apr. 12, 2017—U.S. Office Action—U.S. Appl. No. 14/757,638.
Aug. 15, 2017 (WO) International Preliminary Report on Patentability—App. PCT/US2015/062691.
Aug. 21, 2017 (AU) First Examination Report—App. 2015248067.
Feb. 10, 2017—U.S. Notice of Allowance—U.S. Appl. No. 14/625,486.
Feb. 15, 2017—U.S. Notice of Allowance—U.S. Appl. No. 14/921,718.
Jul. 20, 2017 U.S. Complaint for Patent Infringement—Case No. 2:17-cv-00383-HCN-LRL, Document 1, 38 pages.
Jun. 7, 2017—U.S. Office Action—U.S. Appl. No. 14/745,207.
Jun. 7, 2017—(WO) International Search Report and Written Opinion—App PCT/US2016/067111.
Mar. 6, 2017—(WO) International Search Report and Written Opinion—App PCT/US2016/068008.
Nov. 21, 2017 U.S. Notice of Allowance—U.S. Appl. No. 14/690,302.
Nov. 3, 2017 U.S. Non-Final Office Action—U.S. Appl. No. 15/413,834.
Oct. 17, 2017 (WO) International Preliminary Report on Patentability—App. PCT/US2016/026339.
Sep. 5, 2017 U.S. Defendant Ixia's Partial Answer to Complaint for Patent Infringement—Case No. 2:17-cv-00383-HCN-LRL, Document 29, 14 pages.
Sep. 5, 2017 U.S. Memorandum in Support of Defendant's Ixia and Keysight Technologies, Inc's Motion to Dismiss for Unpatentability Under 35 U.S.C. § 101—Case No. 2:17-cv-00383-HCM-LRL, Document 21, 29 pages.
Sep. 5, 2017 U.S. Request for Judicial Notice in Support of Defendants Ixia and Keysight Technologies, Inc's Motion to Dismiss for Unpatentability under 35 U.S.C. § 101—Case No. 2:17-cv-00383-HCN-LRL, Document 22, 3 pages.
Sep. 29, 2017 (CA) Examination Report—App. 2,772,630.
Apr. 17, 2018 U.S. Non-Final Office Action—U.S. Appl. No. 15/610,995.
Jul. 13, 2018 U.S. Notice of Allowance—U.S. Appl. No. 15/414,117.
Jul. 5, 2018 U.S. Non-Final Office Action—U.S. Appl. No. 15/413,750.
Mar. 15, 2018 (EP) Second Communication pursuant to Article 94(3) EPC—App. 13765547.8.
Mar. 16, 2018 (EP) Communication Pursuant to Rule 164(2)(b) and Article 94(3) EPC—App. 15722292.8.
Mar. 21, 2018 (AU) First Examination Report—App. 2015382393.
Mar. 8, 2018 U.S. Non-Final Office Action—U.S. Appl. No. 14/745,207.
May 25, 2018 U.S. Notice of Allowance—U.S. Appl. No. 15/413,834.
A. Feldmann et al., "Tradeoffs for Packet Classification", Proceedings of the IEEE INFOCOM, 397-413, 2000.
A. Hari et al., "Detecting and Resolving Packet Filter Conflicts", Proceedings of IEEE INFOCOM, 1203-1212, 2000.
Acharya et al, "Optwall: A Hierarchical Traffic-Aware Firewall," Department of Computer Science, Telecommunications Program, University of Pittsburgh, pp. 1-11 (2007).
Bellion, "High Performance Packet Classification", http://www.hipac.org (Publication Date Unknown).
C. Benecke, "A Parallel Packet Screen for High Speed Networks", Proceedings of the 15th Annual Computer Security Applications Conference, 1999.
Chen, et al, "Research on the Anomaly Discovering Algorithm of the Packet Filtering Rule Sets," Sep. 2010, First International Confererence on Pervasive Computing, Signal Processing and Applications, pp. 362-366.
Apr. 17, 2023 U.S. Decision Granting Institution of Inter Partes Review 35 U.S.C. § 314, IPR2022-01525, U.S. Pat. No. 10,284,526B2, 64 pages.
Feb. 22, 2023 U.S. Order No. 37: Construing Certain Terms of the Asserted Claims (Markman Claim Construction), Inv. No. 337-TA-1314, 41 pages.
Sep. 12, 2022—Petition for Inter Partes Review of U.S. Pat. No. 10,284,526 B2, PTAB Case No. IPR2022-01525, U.S Pat. No. 10,284,526 B2, 83 pages.
Exhibit 1008 as cited in Petition for Inter Partes review of U.S. Pat. No. 10,284,526 B2, dated Sep. 12, 2022, Cisco IronPort AsyncOS 7.1 for Web User Guide ("IPUG"), Nov. 2010, 824 pages.
"Control Plane Policing Implementation Best Practices"; Cisco Systems; Mar. 13, 2013; <https://web.archive.org/web/20130313135143/http:www.cisco.com/web/about/security/intelligence/coppwp_gs.html>.
Sep. 11, 2006—(WO) Written Opinion of the International Searching Authority—App PCT/US05/47008.
Aug. 31, 2007—(EP) Communication Pursuant to Rules 109 and 110—App 05857614.1.

(56) References Cited

OTHER PUBLICATIONS

Jul. 3, 2008—(WO) Written Opinion of the International Searching Authority—App PCT/US06/11291.
Jun. 24, 2009—U.S. Office Action—U.S. Appl. No. 11/390,976.
Sep. 14, 2009 U.S. Office Action—U.S. Appl. No. 11/316,331.
Apr. 29, 2010—U.S. Interview Summary—U.S. Appl. No. 11/390,976.
Aug. 20, 2010—(AU) Office Action—App 2005328336.
Jun. 23, 2010—U.S. Final Rejection—U.S. Appl. No. 11/316,331.
Mar. 26, 2010—U.S. Final Rejection—U.S. Appl. No. 11/390,976.
Sep. 10, 2010—(AU) Office Action—App 2006230171.
Sep. 30, 2010—U.S. Office Action—U.S. Appl. No. 11/390,976.
Apr. 27, 2011—(WO) International Search Report and Written Opinion—App PCT/US2010/054520.
Aug. 25, 2011—U.S. Non Final Rejection—U.S. Appl. No. 12/871,806.
Feb. 14, 2011—(EP) Search Report—App 06758213.0.
Jun. 9, 2011—U.S. Notice of Allowance—U.S. Appl. No. 11/390,976.
Mar. 3, 2011—(EP) Communication Pursuant to Rules 70(2) and 70a(2)—App 06758213.0.
Mar. 4, 2011—U.S. Notice of Allowance—U.S. Appl. No. 11/316,331.
Nov. 11, 2011—(AU) Second Office Action—App 2006230171.
Oct. 18, 2011—(EP) Communication Pursuant to Article 94(3)—App 06 758 213.0.
Aug. 7, 2012—U.S. Non Final Rejection—U.S. Appl. No. 12/871,806.
Feb. 6, 2012—U.S. Final Rejection—U.S. Appl. No. 12/871,806.
Jun. 9, 2012—(AU) Notice of Acceptance—App 2006230171.
Jun. 26, 2012—(EP) Extended Search Report—App 05857614.1.
Nov. 20, 2012—(EP) Communication under rule 71(3)—App 06 758 213.0.
Nov. 26, 2012—U.S. Final Rejection—U.S. Appl. No. 12/871,806.
Apr. 4, 2013—U.S. Notice of Allowance—U.S. Appl. No. 12/871,806.
Apr. 18, 2013—(EP) Decision to Grant a European Patent—App 06758212.0.
Jan. 16, 2013—(CA) Office Action—App 2,594,020.
Jan. 17, 2013—(CA) Office Action—App 2,600,236.
Nov. 7, 2013 (WO) International Search Report—App. PCT/US2013/057502.
Jun. 24, 2014 (WO) International Search Report—App. PCT/US2014/023286.
Jun. 26, 2014 (WO) International Search Report—App. PCT/US2014/027723.
Mar. 24, 2014 (WO) International Search Report—App. PCT/US2013/072566.
May 26, 2014—(CA) Office Action—App 2010297968.
Apr. 28, 2015 (WO) International Preliminary Report on Patentability—App. PCT/US2013/057502, dated Apr. 28, 2015.
Dec. 22, 2015—U.S. Final Office Action—U.S. Appl. No. 14/714,207.
Jan. 14, 2015—(EP) Extended Search Report—App 10819667.6.
Jul. 10, 2015—(WO) Communication Relating to the Results of the Partial International Search for International App—PCT/US2015/024691.
Jul. 14, 2015—(WO) International Preliminary Report on Patentability—App PCT/US2013/072566.
May 14, 2015—U.S. Non Final Rejection—U.S. Appl. No. 13/940,240.
May 25, 2015—(AU) Notice of Acceptance—App 2010297968.
Nov. 2, 2015—(AU) Office Action—App 2013372879.
Nov. 27, 2015—U.S. Final Rejection—U.S. Appl. No. 13/940,240.
Sep. 15, 2015 (WO) International Preliminary Report on Patentability—App.—PCT/US2014/027723.
Sep. 15, 2015 (WO) International Preliminary Report on Patentability—App. PCT/US2014/023286.
Sep. 16, 2015 (WO) International Search Report and Written Opinion—App. No. PCT/US2015/024691.
Sep. 4, 2015 U.S. Notice of Allowance—U.S. Appl. No. 14/702,755.
Apr. 15, 2016—U.S. Notice of Allowance—U.S. Appl. No. 14/855,374.
Apr. 26, 2016—U.S. Office Action—U.S. Appl. No. 14/745,207.
Exhibit 44, as cited in Complaint of Centripetal Networks, Inc. dated Apr. 19, 2022, Keysight Webpage: Vision X Network Packet Broker, dated Feb. 3, 2022, 8 pages.
Exhibit 45, as cited in Complaint of Centripetal Networks, Inc. dated Apr. 19, 2022, Keysight Investor Day 2020 Presentation, dated Mar. 3, 2020, 172 pages.
Exhibit 46, as cited in Complaint of Centripetal Networks, Inc. dated Apr. 19, 2022, Keysight Press Release: Keysight Technologies' Corporate Headquarters Operational After Northern California Fires, dated Nov. 6, 2017, 3 pages.
Exhibit 47, as cited in Complaint of Centripetal Networks, Inc. dated Apr. 19, 2022, Keysight/Ixia Vision One Product Label, 2 pages.
Exhibit 49, as cited in Complaint of Centripetal Networks, Inc. dated Apr. 19, 2022, Keysight Webpage: Support, dated Jan. 25, 2022, 3 pages.
Exhibit 50, as cited in Complaint of Centripetal Networks, Inc. dated Apr. 19, 2022, Keysight Webpage: Keysight Support, dated Jan. 25, 2022, 4 pages.
Exhibit 51, as cited in Complaint of Centripetal Networks, Inc. dated Apr. 19, 2022, Ixia Webpage: Support, dated Jan. 25, 2022, 11 pages.
Exhibit 52, as cited in Complaint of Centripetal Networks, Inc. dated Apr. 19, 2022, Keysight White Paper: Advanced Security Intelligence with Rap Sheet Analytics, dated Nov. 10, 2021, 9 pages.
Exhibit 53, as cited in Complaint of Centripetal Networks, Inc. dated Apr. 19, 2022, Ixia Case Study: Financial Investment Firm Reduces Risk, 6 pages.
Exhibit 54, as cited in Complaint of Centripetal Networks, Inc. dated Apr. 19, 2022, Keysight Press Release: Keysight's New Security Operations Platform Enables Organizations to Measure and Improve Effectiveness of Operational Security, dated Feb. 6, 2022, 7 pages.
Exhibit 55, as cited in Complaint of Centripetal Networks, Inc. dated Apr. 19, 2022, Keysight Form 10-K Annual Report for the fiscal year ended Oct. 31, 2021, 161 pages.
Exhibit 56, as cited in Complaint of Centripetal Networks, Inc. dated Apr. 19, 2022, Keysight Webpage: TradeVision, dated Jan. 25, 2022, 11 pages.
Exhibit 57, as cited in Complaint of Centripetal Networks, Inc. dated Apr. 19, 2022, Keysight Webpage: Network Security Tools, dated Jan. 25, 2022, 6 pages.
Exhibit 58, as cited in Complaint of Centripetal Networks, Inc. dated Apr. 19, 2022, Keysight Webpage: Sales Request, dated Feb. 4, 2022, 6 pages.
Exhibit 59, as cited in Complaint of Centripetal Networks, Inc. dated Apr. 19, 2022, CDW.com Webpage: Ixia Vision One with Fixed 48 Part SFP+ Security Appliance, dated Feb. 4, 2022, 4 pages.
Exhibit 60, as cited in Complaint of Centripetal Networks, Inc. dated Apr. 19, 2022, Insight.com Webpage: Ixia Vision One Sys-Va-48PX-AC Security Appliance, dated 2022, 5 pages.
Exhibit 61, as cited in Complaint of Centripetal Networks, Inc. dated Apr. 19, 2022, Shi.com Webpage: Ixia ThreatARMOR 1G Security Appliance, dated Feb. 4, 2022, 4 pages.
Exhibit 62, as cited in Complaint of Centripetal Networks, Inc. dated Apr. 19, 2022, Deltatechsol.com Webpage: Ixia ThreatARMOR-1G—ThreatArmor 1GBE Security Appliance with 4 1GB SFP Ports, Requires Active ATI, dated Feb. 4, 2022, 5 pages.
Exhibit 63, as cited in Complaint of Centripetal Networks, Inc. dated Apr. 19, 2022, Caegis Solutions Ebay Invoice: Ixia Vision One Security Appliance 48-Ports + 48 SFP-10G SR 2x PSU, dated Dec. 16, 2021, 2 pages.
Exhibit 67, as cited in Complaint of Centripetal Networks, Inc. dated Apr. 19, 2022, Ixia Press Release: Ixia Leverages the Cloud to Streamline Network Threat Intelligence, dated Nov. 9, 2016, 5 pages.
Exhibit 68, as cited in Complaint of Centripetal Networks, Inc. dated Apr. 19, 2022, Ixia White Paper: Application and Threat Intelligence Research Center, dated 2019, 5 pages.
Exhibit 69, as cited in Complaint of Centripetal Networks, Inc. dated Apr. 19, 2022, Ixia Feature Brief: SecureStack—Optimized Handling of Secure Traffic, dated 2018, 4 pages.
Exhibit 70, as cited in Complaint of Centripetal Networks, Inc. dated Apr. 19, 2022, Keysight Data Sheet: Vision One Security Without Sacrifice, dated Jul. 23, 2021, 13 pages.

(56) References Cited

OTHER PUBLICATIONS

Exhibit 71, as cited in Complaint of Centripetal Networks, Inc. dated Apr. 19, 2022, Ixia Technical Overview: Ixia's Inline Security Architecture, dated Jan. 7, 2020, 35 pages.
Exhibit 72, as cited in Complaint of Centripetal Networks, Inc. dated Apr. 19, 2022, Keysight White Paper: Inspecting SSL Traffic: Achieving the Right Balance of Visibility and Security, dated May 22, 2020, 9 pages.
Exhibit 73, as cited in Complaint of Centripetal Networks, Inc. dated Apr. 19, 2022, Keysight Solution Brief: Security: In An Encrypted World, dated Feb. 25, 2020, 7 pages.
Exhibit 74, as cited in Complaint of Centripetal Networks, Inc. dated Apr. 19, 2022, Centripetal Service Brief: CleanINTERNET, dated 2018, 3 pages.
Exhibit 75, as cited in Complaint of Centripetal Networks, Inc. dated Apr. 19, 2022, Centripetal Product Brief: CleanINTERNET, dated 2018, 3 pages.
Exhibit 76, as cited in Complaint of Centripetal Networks, Inc. dated Apr. 19, 2022, Centripetal: CleanINTERNET Managed Security Services, dated, 13 pages.
Exhibit 78, as cited in Complaint of Centripetal Networks, Inc. dated Apr. 19, 2022, Centripetal White Paper: Far Beyond The Firewall: Centripetal CleanINTERNET Service, dated 2019, 6 pages.
Exhibit 80, as cited in Complaint of Centripetal Networks, Inc. dated Apr. 19, 2022, Keysight Software Entitlement Certificate, 2 pages.
Exhibit 81, as cited in Complaint of Centripetal Networks, Inc. dated Apr. 19, 2022, Keysight Shipping Point Labels, 2 pages.
Exhibit 82, as cited in Complaint of Centripetal Networks, Inc. dated Apr. 19, 2022, Guidepoint Security, LLC Invoice, dated Feb. 24, 2022, 2 pages.
Appendix A, as cited in Complaint of Centripetal Networks, Inc. dated Apr. 19, 2022, Prosecution History for U.S. Pat. No. 9,264,370, (2 parts), 609 pages.
Appendix C, as cited in Complaint of Centripetal Networks, Inc. dated Apr. 19, 2022, Prosecution History for U.S. Pat. No. 10,193,917, 555 pages.
Appendix E, as cited in Complaint of Centripetal Networks, Inc. dated Apr. 19, 2022, Prosecution History for U.S. Pat. No. 10,284,526 (20 parts), 9,093 pages.
Statement Re: Related Application, dated Sep. 30, 2015, 1 page.
Nov. 29, 2017 U.S. Defendant Keysight Technologies, Inc.'s Answer to Complaint for Patent Infringement—Case No. 2:17-cv-00383-HCN-LRL, Document 62, 20 pages.
Jun. 23, 2022, Complainant Centripetal Networks, Inc.'s Notice of Priority and Conception Dates, Investigation No. 337-TA-1314, In the Matter of Certain Computer Network Security Equipment and Systems, Related Software, Components Thereof, and Products Containing Same, 4 pages.
Aug. 8, 2023, Notice: Issuance of Initial Determination on Violation of Section 337 with Recommendation on Remedy, Inv. No. 337-TA-1314, 2 pages.
Exhibit 1024—"File Transfer Protocol," IETF RFC 765, J. Postel, ed., Jun. 1980.
May 20, 2019 U.S. Decision—Institution of Inter Partes Review of U.S. Pat. No. 9,413,722 B1—IPR 2018-01760.
Aug. 20, 2019 U.S. Declaration of Dr. Alessandro Orso in Support of Patent Owner's Response of U.S. Pat. No. 9,413,722—IPR 2018-01760.
Feb. 21, 2019 U.S. Patent Owner's Preliminary Response of U.S. Pat. No. 9,413,722—IPR 2018-01760.
Aug. 20, 2019 U.S. Patent Owner's Response of U.S. Pat. No. 9,413,722—IPR 2018-01760.
Jan. 15, 2020 U.S. Patent Owner's Sur-Reply to Petitioner's Reply—IPR 2018-01760.
Jan. 8, 2020 U.S. Deposition of Jacob H. Baugher, III—IPR 2018-01760.
Jan. 19, 2021—(EP) Communication—App 18752378.2.

May 26, 2021—U.S. Non-Final Office Action—U.S. Appl. No. 16/356,421.
Aug. 5, 2021—(EP) Examination Report—App 18752378.2.
Apr. 29, 2022, First Public Supplement to the Complaint and Exhibits, Certain Computer Network Security Equipment and Systems, Related Software, Components Thereof, and Products Containing Same, Inv. No. 337-TA-3614, 43 pages.
Apr. 19, 2022, Public Complaint, Certain Computer Network Security Equipment and Systems, Related Software, Components Thereof, and Products Containing Same Inv. No. 337-TA-, 71 pages.
May 24, 2022, Tuesday, Federal Register, Notice of Institution of Investigation, vol. 87, No. 100, Notices, 2 pages.
Jun. 1, 2022, Order No. 3: Initial Determination Setting a Target Date, In the Matter of Certain Computer Network Security Equipment and Systems, Related Software, Components Thereof, and Products Containing Same, Inv. No. 337-TA-1314, 1 page.
May 18, 2022, Notice of Institution of Investigation, in the Matter of Certain Computer Network Security Equipment and Systems, Related Software, Components Thereof, and Products Containing Same, Inv. No. 337-TA-1314, 13 pages.
Jun. 13, 2022, Respondent Keysight Technologies, Inc.'s Response to the Complaint and Notice of Investigation, In the Matter of Certain Computer Network Security Equipment & Systems, Related Software, Components Thereof, & Products Containing Same, Inv. No. 337-TA-131, 62 pages.
Jun. 13, 2022, Public Version of Exhibit 1, Confidential Exhibit 1 to Keysight Technologies, Inc.'s Response to the Complaint and Notice of Investigation, In the Matter of Certain Computer Network Security Equipment and Systems, Related Software, Components Thereof, and Products Containing Same, Inv. No. 337-TA-1314, 5 pages.
Apr. 20, 2022, Notice of Receipt of Complaint; Solicitation of Comments Relating to the Public Interest, U.S. International Trade Commission, 3 pages.
Exhibit 1, as cited in Complaint of Centripetal Networks, Inc., dated Apr. 19, 2022, U.S. Pat. No. 9,264,370, 41 pages.
Exhibit 2, as cited in Complaint of Centripetal Networks, Inc., dated Apr. 19, 2022, U.S. Pat. No. 10,193,917, 45 pages.
Exhibit 3, as cited in Complaint of Centripetal Networks, Inc. dated Apr. 19, 2022, U.S. Pat. No. 10,284,526, 28 pages.
Exhibit 4, as cited in Complaint of Centripetal Networks, Inc. dated Apr. 19, 2022, Press Release: Centripetal Named Sinet 16 Innovator for 2017, <<https://www.centripetal.ai/centripetal-named-sinet-16-innovator/>>, dated Oct. 31, 2017, 4 pages.
Exhibit 5, as cited in Complaint of Centripetal Networks, Inc. dated Apr. 19, 2022, Press Release: Centripetal Networks Named a 2017 Gartner "Cool Vendor" in Security, dated Jul. 25, 2017, 4 pages.
Exhibit 6, as cited in Complaint of Centripetal Networks, Inc. dated Apr. 19, 2022, Press Release: Centripetal Ranked No. 93 of the Fastest Growing Companies in North America on Deloitte's 2019 Technology Fast 500, dated Dec. 2, 2019, 4 pages.
Exhibit 7, as cited in Complaint of Centripetal Networks, Inc. dated Apr. 19, 2022, ComPress Release: Centripetal Features in Deloitte's 2020 Technology Fast 500, dated Dec. 1, 2020, <<https://www.centripetal.ai/deloittes-2020-technology-fast-500/>>, 4 pages.
Exhibit 8, as cited in Complaint of Centripetal Networks, Inc. dated Apr. 19, 2022, Deloitte 2021 Technology Fast 500 Rankings, updated Nov. 2021, 16 pages.
Exhibit 9, as cited in Complaint of Centripetal Networks, Inc. dated Apr. 19, 2022, SC Media Article: Finalists: Best Threat Intelligence Technology, dated Mar. 29, 2021, The Wayback Machine—<<http://web.archive.org/web/20210430232211/https://www.scmagaine.co . . . >>, 8 pages.
Exhibit 10, as cited in Complaint of Centripetal Networks, Inc. dated Apr. 19, 2022, Centripetal Data Sheet: RuleGATE 2000 Gateway, dated 2017, 3 pages.
Exhibit 11, as cited in Complaint of Centripetal Networks, Inc. dated Apr. 19, 2022, Centripetal Webpage: CleanINTERNET, dated Feb. 8, 2022, 25 pages.
Exhibit 12, as cited in Complaint of Centripetal Networks, Inc. dated Apr. 19, 2022, Public Version, Declaration of Jonathan Rogers in Support of Complaint of Centripetal Networks, Inc., dated Apr. 18, 2022, 9 pages.

(56) References Cited

OTHER PUBLICATIONS

Exhibit 13, as cited in Complaint of Centripetal Networks, Inc. dated Apr. 19, 2022, Centripetal Case Study: Financial Services Organization Sees Success with Smarter Threat Intelligence, dated 2018, 3 pages.

Exhibit 14, as cited in Complaint of Centripetal Networks, Inc. dated Apr. 19, 2022, Centripetal Case Study: Insurance Company Gains Real-Time Networks Enforcement, dated 2018, 3 pages.

Exhibit 15, as cited in Complaint of Centripetal Networks, Inc. dated Apr. 19, 2022, Centripetal Case Study: Retailer Safeguards Network with Advanced Security Solutions, dated 2018, 3 pages.

Exhibit 16, as cited in Complaint of Centripetal Networks, Inc. dated Apr. 19, 2022, Certified Assignments for U.S. Pat. No. 9,264,370, 30 pages.

Exhibit 17, as cited in Complaint of Centripetal Networks, Inc. dated Apr. 19, 2022, Certified Assignments for U.S. Pat. No. 10,193,917, 12 pages.

Exhibit 18, as cited in Complaint of Centripetal Networks, Inc. dated Apr. 19, 2022, Certified Assignments for U.S. Pat. No. 10,284,526, 5 pages.

Exhibit 19, as cited in Complaint of Centripetal Networks, Inc. dated Apr. 19, 2022, Keysight Webpage: ThreatARMOR: Threat Intelligence Gateway, dated Jan. 5, 2022, 7 pages.

Exhibit 20, as cited in Complaint of Centripetal Networks, Inc. dated Apr. 19, 2022, Keysight Webpage: Application and Threat Intelligence (Subscription), dated Feb. 3, 2022, 4 pages.

Exhibit 21, as cited in Complaint of Centripetal Networks, Inc. dated Apr. 19, 2022, Infringement Chart for U.S. Pat. No. 9,264,370, 52 pages.

Exhibit 22, as cited in Complaint of Centripetal Networks, Inc. dated Apr. 19, 2022, Infringement Chart for U.S. Pat. No. 10,193,917, 29 pages.

Exhibit 23, as cited in Complaint of Centripetal Networks, Inc. dated Apr. 19, 2022, Infringement Chart for U.S. Pat. No. 10,284,526, 27 pages.

Exhibit 24, as cited in Complaint of Centripetal Networks, Inc. dated Apr. 19, 2022, IPWatchdog.com Article: Centripetal Networks Awarded $1.9 Billion in Infringement Suit Against Cisco, dated Oct. 9, 2020, 6 pages.

Exhibit 25, as cited in Complaint of Centripetal Networks, Inc. dated Apr. 19, 2022, SC Media Article: Judge Denies Cisco New Trial, Upholds Judgment in Patent Infringement Suit, dated Mar. 29, 2021, 4 pages.

Exhibit 26, as cited in Complaint of Centripetal Networks, Inc. dated Apr. 19, 2022, Keysight Network Visibility Products Catalog, dated Nov. 3, 2021, 19 pages.

Exhibit 27 as cited in Complaint of Centripetal Networks, Inc. dated Apr. 19, 2022, Keysight Webpage: Vision One, dated Jan. 9, 2022, 11 pages.

Exhibit 28, as cited in Complaint of Centripetal Networks, Inc. dated Apr. 19, 2022, Keysight Webpage: Network Packet Brokers, dated Dec. 31, 2021, 5 pages.

Exhibit 29, as cited in Complaint of Centripetal Networks, Inc. dated Apr. 19, 2022, Keysight Data Sheet: CloudLens Self-Hosted, dated Aug. 21, 2020, 20 pages.

Exhibit 30, as cited in Complaint of Centripetal Networks, Inc. dated Apr. 19, 2022, Keysight Webpage: NetStack, dated Dec. 31, 2021, 6 pages.

Exhibit 31, as cited in Complaint of Centripetal Networks, Inc. dated Apr. 19, 2022, Keysight Webpage: SecureStack, dated Dec. 31, 2021, 6 pages.

Exhibit 32, as cited in Complaint of Centripetal Networks, Inc. dated Apr. 19, 2022, Keysight Webpage: AppStack, dated Dec. 31, 2021, 6 pages.

Exhibit 33, as cited in Complaint of Centripetal Networks, Inc. dated Apr. 19, 2022, Keysight Webpage: AppStack, dated Dec. 31, 2021, 6 pages.

Exhibit 34, as cited in Complaint of Centripetal Networks, Inc. dated Apr. 19, 2022, Keysight Webpage: MobileStack, dated Dec. 31, 2021, 7 pages.

Exhibit 35, as cited in Complaint of Centripetal Networks, Inc. dated Apr. 19, 2022, Keysight Data Sheet: ThreatARMOR, dated Apr. 28, 2021, 6 pages.

Exhibit 36, as cited in Complaint of Centripetal Networks, Inc. dated Apr. 19, 2022, Keysight Solution Brief: Threat Simulator: Proving You're Safer Than You Were Yesterday, dated Nov. 25, 2020, 5 pages.

Exhibit 37, as cited in Complaint of Centripetal Networks, Inc. dated Apr. 19, 2022, Keysight Webpage: Network Security Tools, dated Dec. 31, 2021, 6 pages.

Exhibit 38, as cited in Complaint of Centripetal Networks, Inc. dated Apr. 19, 2022, Keysight Webpage: Application and Threat Intelligence (Subscription), dated Dec. 31, 2021, 7 pages.

Exhibit 39, as cited in Complaint of Centripetal Networks, Inc. dated Apr. 19, 2022, Keysight Webpage: ThreatArmor: Threat Intelligence Gateway, dated Dec. 31, 2021, 9 pages.

Exhibit 41, as cited in Complaint of Centripetal Networks, Inc. dated Apr. 19, 2022, Keysight Webpage: CloudLens, dated Jan. 25, 2022, 9 pages.

Exhibit 42, as cited in Complaint of Centripetal Networks, Inc. dated Apr. 19, 2022, Keysight Data Sheet: Vision X Network Packet Broker, dated Oct. 13, 2021, 13 pages.

Exhibit 43, as cited in Complaint of Centripetal Networks, Inc. dated Apr. 19, 2022, Keysight Webpage: Vision One, dated Feb. 3, 2022, 7 pages.

Dec. 7, 2023 (U.S.) Patent Owner's Sur-Reply, Case IPR2022-01525, U.S. Pat. No. 10,284,526 B2, 34 pages.

Apr. 15, 2024 (U.S.) Judgment, Final Written Decision, IPR2022-01525, Paper 27, U.S. Pat. No. 10,284,526 B2, 68 pages.

* cited by examiner

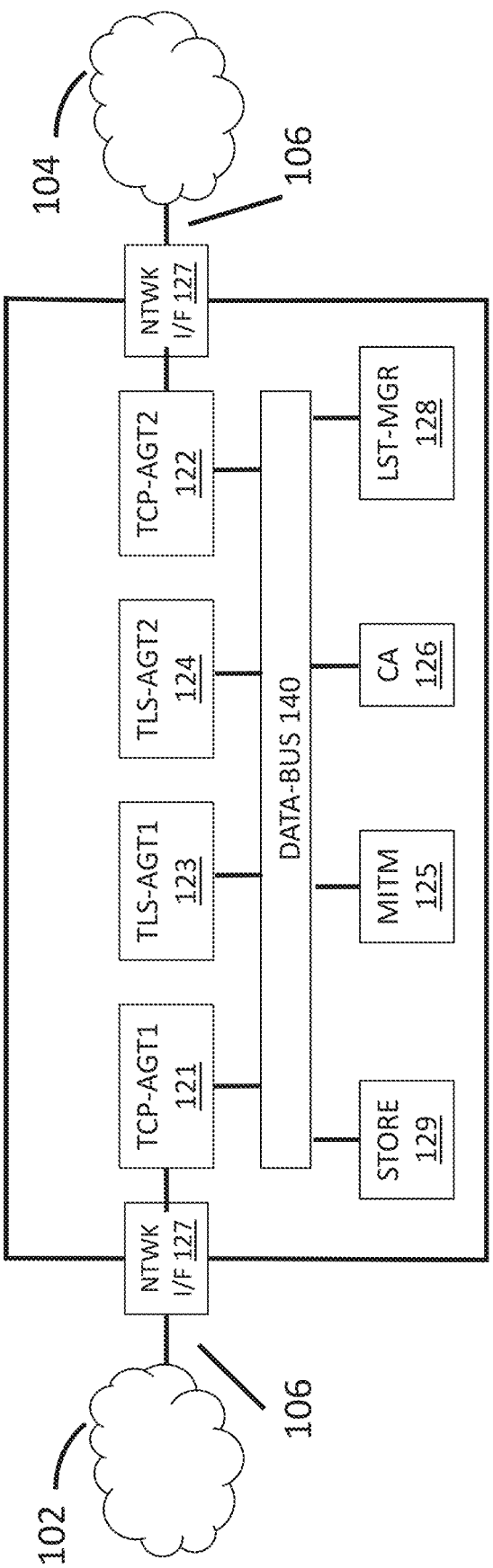

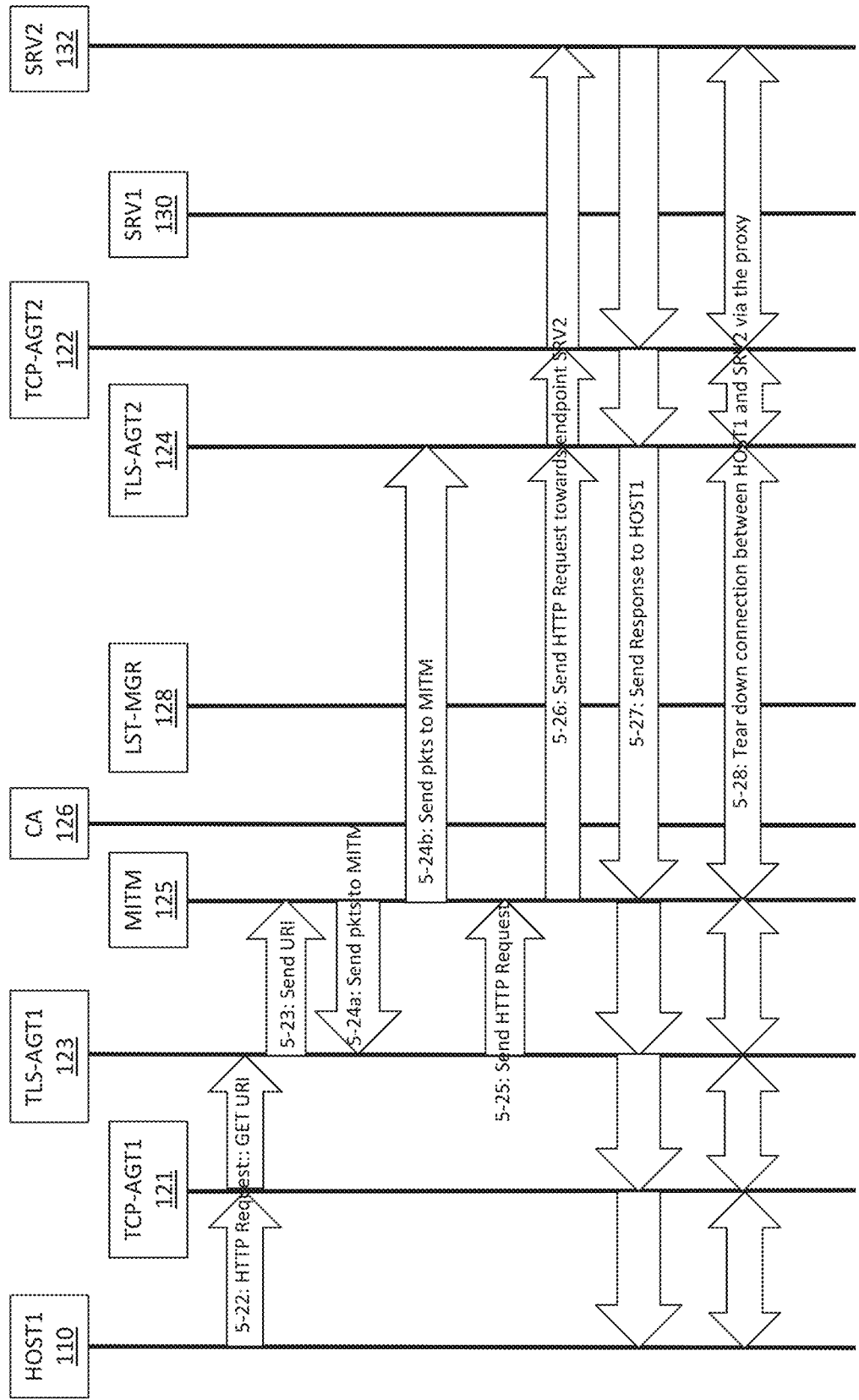

EFFICIENT SSL/TLS PROXY

CROSS-REFERENCE TO RELATED APPLICATION(S)

The present application is a continuation of U.S. patent application Ser. No. 16/356,421, filed Mar. 18, 2019, now U.S. Pat. No. 11,233,777, which is a continuation of co-pending U.S. patent application Ser. No. 16/039,896, filed Jul. 19, 2018, now U.S. Pat. No. 10,284,526, which is a non-provisional of U.S. Patent Application Ser. No. 62/536,254, filed Jul. 24, 2017. The entire contents of which are hereby incorporated by reference in their entirety for all purposes.

FIELD

Aspects described herein generally relate to computer hardware and software and network security. In particular, one or more aspects of the disclosure generally relate to computer hardware and software for selectively decrypting encrypted communications.

BACKGROUND

Network security is becoming increasingly important as the information age continues to unfold. In TCP/IP networks, in-transit communications between endpoints may be secured by using the Transport Layer Security (TLS) protocol, or by using TLS's predecessor, the Secure Sockets Layer (SSL) protocol. TLS provides for privacy, authentication, and integrity of communications. For example, the Secure Hyper-Text Transfer Protocol (HTTPS) protocol that is commonly used to secure web communications consists of communication over Hyper-Text Transfer Protocol (HTTP) within a connection encrypted by TLS or SSL. Often, it may be desirable to use an inline SSL/TLS proxy to intercept and decrypt an in-transit TLS communication in order to inspect the communication's plaintext and then take some action based on the plaintext content. Typically, an SSL/TLS proxy decrypts all of the SSL/TLS-secured communications passing through it; but this may be undesirable and inefficient because of, for example, computational resource issues, network performance issues, management complexity issues, and/or privacy protection issues. Accordingly, there is a need for methods and logic by which an SSL/TLS proxy can selectively decrypt SSL/TLS communications.

SUMMARY

The following presents a simplified summary in order to provide a basic understanding of some aspects of the disclosure. It is intended neither to identify key or critical elements of the disclosure nor to delineate the scope of the disclosure. The following summary merely presents some concepts of the disclosure in a simplified form as a prelude to the description below.

Aspects of this disclosure relate to an efficient SSL/TLS proxy that selectively decrypts SSL/TLS communications. Additional logic may then be applied to the contents of the decrypted communications that may result in some action; for example, to terminate the communications, or to log and store the plaintext packets composing the communications for subsequent content inspection and analysis. In accordance with embodiments of the disclosure, an efficient SSL/TLS proxy may receive data that indicates which SSL/TLS communications are to be decrypted; alternatively, the data may indicate which SSL/TLS communications are not to be decrypted. Additionally or alternatively, the efficient SSL/TLS proxy may receive a hybrid list indicating a portion of SSL/TLS communications that are to be decrypted and another portion of SSL/TLS communications that are not to be decrypted. The data indicating the SSL/TLS communications may comprise application-level (Layer 7) information to identify one or more sets of SSL/TLS communications In some embodiments, the identification data may comprise Uniform Resource Identifiers ((URIs), which include Uniform Resource Locators (URLs)) associated with the communication. In other embodiments, the identification data may comprise Fully Qualified Domain Names (FQDNs). In yet other embodiments, the identification data may comprise Internet Protocol (IP) addresses. In some scenarios, the identification data for the SSL/TLS communication may be embedded within the encrypted packets, and thus not available for examination as plaintext. Such may be the case for HTTPS communications, as well as for other protocols that use URIs, FQDNs for host names, and domain names for addressing, and are secured by SSL/TLS, such as Secure File Transfer Protocol (FTPS). In such scenarios, the efficient SSL/TLS proxy may examine the information contained in the TLS handshake protocol and/or examine other information associated with the connection. Based on the examination, and on a comparison of the communications identification list, the efficient SSL/TLS proxy may determine whether or not to decrypt the encrypted communications. If or when the efficient SSL/TLS proxy determines that the encrypted communication is to be decrypted, then the efficient SSL/TLS proxy may decrypt the communications so that the plaintext content may be inspected. The efficient SSL/TLS proxy may comprise additional logic to inspect the plaintext content after it has been decrypted. In some embodiments, the efficient SSL/TLS proxy may take additional actions based on the plaintext content. These additional actions may be taken to result in some higher-level application or policy, such as cybersecurity, e.g., protecting a network and its assets from attacks perpetrated by malicious actors; or such as wiretapping associated with law enforcement, where only specific communications may be decrypted for observation; or such as protecting the privacy of personal medical and medical insurance information. If or when the efficient SSL/TLS proxy determines that the encrypted communication is not to be decrypted, then this may also be to effect some higher-level application or policy, such as privacy protection and compliance with privacy laws and policies.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein:

FIG. 3 depicts an illustrative efficient SSL/TLS proxy for selective decryption of encrypted communications in accordance with one or more aspects of the disclosure;

FIGS. 4A, 4B, 5A, 5B, 5C, and 6 depict example event sequences that illustrate methods for selectively decrypting TLS-secured communications in accordance with one or more illustrative aspects described herein.

FIGS. 4A and 4B illustrate processes in which the efficient SSL/TLS proxy determines to not decrypt an HTTPS session, based on the domain name of the HTTPS server.

FIGS. 5A, 5B, and 5C illustrate processes in which the efficient SSL/TLS proxy may determine to decrypt an HTTPS session, based on the domain name of the HTTPS server.

FIG. 6 depicts illustrate a process similar to FIG. 5 except the session's URI does not match any element in URI-decrypt-list.

DETAILED DESCRIPTION

Figure 1:
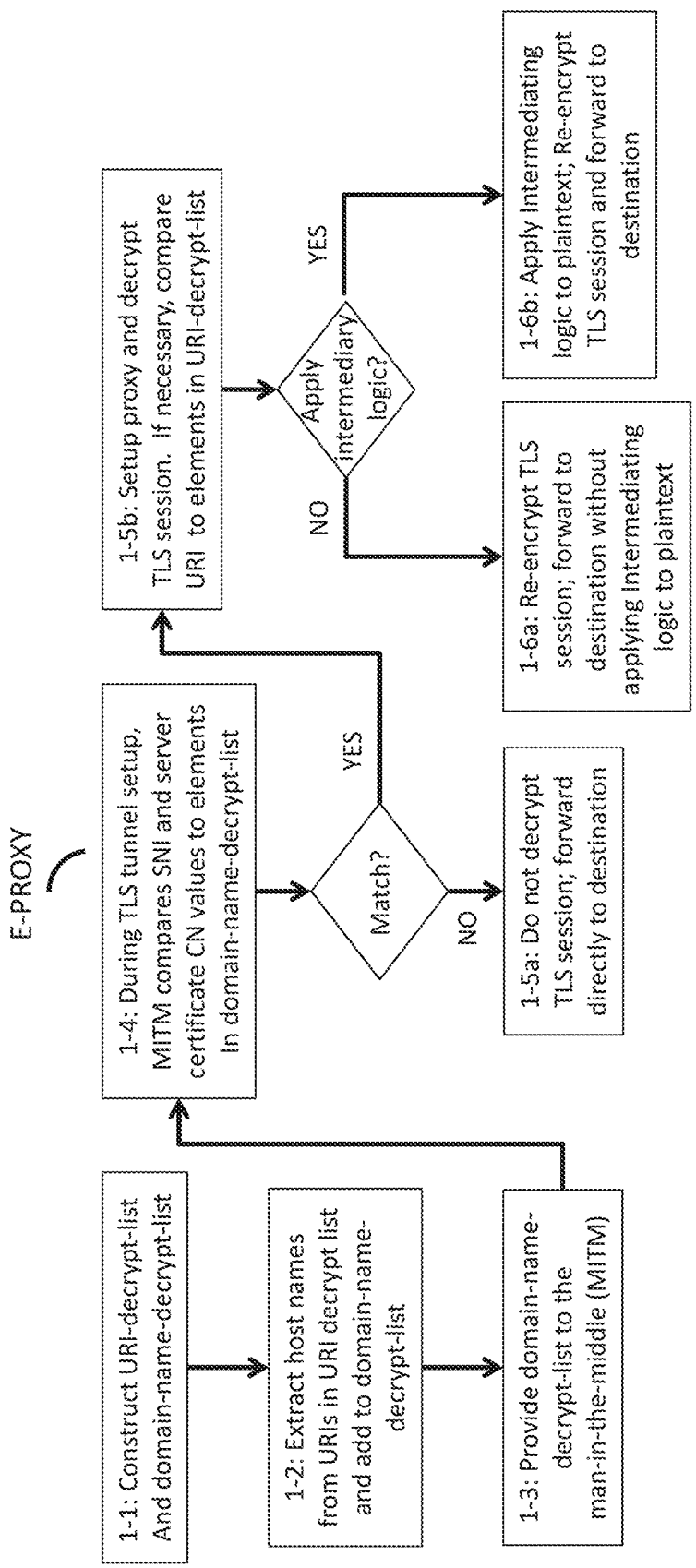
FIG. 1 depicts a flowchart of the operation of an efficient SSL/TLS proxy.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the disclosure. In addition, reference is made to particular applications, protocols, and embodiments in which aspects of the disclosure may be practiced. It is to be understood that other applications, protocols, and embodiments may be utilized, and structural and functional modifications may be made, without departing from the scope of the disclosure.

Various connections between elements are discussed in the following description. These connections are general and, unless specified otherwise, may be direct or indirect, wired or wireless, physical or logical. In this respect, the specification is not intended to be limiting.

For simplicity of description, assumptions are made that the TLS-tunneled protocol is HTTP, that the HTTPS server's port is 443 and TCP, and the IP version is IPv4. These assumptions and associated specifications are not intended to be limiting in any way. The description may be readily adapted to cover other application-level protocols besides HTTP, other ports besides 443, other transport protocols besides TCP (e.g., UDP, SCTP, etc.), and other IP versions, such as IPv6.

Many TCP/IP network communications are transmitted in plaintext, and thus an observer may read the communications by tapping a link (wired, wireless, virtual, etc.) that bears the communications. Such observations may not be desirable. For example, a cybercriminal may observe financial transactions or collect other sensitive data; or, personal privacy may be breached. The Transport Layer Security (TLS) protocol, or its predecessor the Secure Socket Layer (SSL) protocol, may be used to secure in-transit network communications via encryption, and thereby prevent the communications' plaintext from being observed. To secure a communication, two endpoints may first set up a TLS tunnel using the TLS handshake protocol, and then send the communications through the tunnel. The tunnel may afford privacy via encryption; identity authentication via X.509 certificates and associated public-key cryptography; and communications integrity via message authentication coding.

For historical reasons, the labels "SSL" and "TLS" are often used interchangeably, even though TLS has largely replaced and displaced SSL, which is the predecessor of TLS, and which has been deprecated/prohibited by the Internet Engineering Task Force (IETF) because of security flaws. One labeling convention, which is adopted herein, is to use the label "SSL/TLS" to indicate either or both protocols. In the illustrative examples, embodiments, and drawings, the TLS protocol is used, unless otherwise noted, but this does not restrict the scope in any way vis-à-vis SSL, as the differences between SSL and TLS are inconsequential in the context of the present disclosure.

A popular use of SSL/TLS is securing HTTP (web) communications while transiting across networks. This configuration is called the HTTPS protocol. Usage of HTTPS for securing legitimate e-business communications has become widespread. Usage of HTTPS by cybercriminals and other malicious actors has also become widespread with the motivations being that HTTPS obfuscates their malicious activity, and that detection and mitigation of such malicious activity is typically more difficult and costly than for HTTP-mediated malicious activity.

One approach to defending a network from cybercriminals and cyber-attacks may be to: (a) collect cyber threat intelligence (CTI) on the network addresses of endpoints operated/controlled by malicious actors; (b) filter all network traffic—TCP/IP packets—for communications with the network addresses; (c) if a match or correspondence is found between a network address in the CTI and a network communication, then take some action; for example, block the communication; or monitor, log and capture the packets composing the communication; and (d) analyze the communication for attack severity, asset damage, mitigating actions, remedial actions, etc.

Network addresses from CTI may comprise one or more of the following forms of identification data: network-layer (Layer 3) Internet Protocol (IP) addresses and protocol identifiers, transport-layer (Layer 4) ports, and application-layer (Layer 7) domain names (e.g., "cybersite.net"), host FQDNs (e.g., "www.cybersite.net"), URIs (e.g., "http://www.cybersite.net/path-segment-1/path-segment-2/resource-id"), and IP addresses (e.g., contained in HTTP header extensions to identify originating sources). If or when a communication is mediated by HTTP, the network address information for the communication may be filtered directly against CTI because the network address information is not encrypted. If or when a communication is mediated by HTTPS, however, host FQDNs or URI addresses comprised within the HTTP messages may be encrypted, and therefore may not be filtered directly against CTI. This may be problematic for cyber analysts who are searching for cyber threats and attacks, because CTI in the form of URIs are typically considered to be the highest fidelity threat indicators. Conversely, this may be advantageous to cybercriminals, who may evade conventional cybersecurity controls by using HTTPS to transfer sensitive information to URI-addressed resources that they control.

A conventional solution to viewing the plaintext of HTTPS-secured communications may be to deploy inline an SSL/TLS proxy. When two endpoints, for example a web client (e.g., a web browser application) and a web server, initiate an HTTPS session, the proxy may first create two separate TLS tunnels: one between the proxy and the web client, and another between the proxy and the web server. Each tunnel's terminals may encrypt ingressing information and may decrypt egressing information. Inside the proxy, a "man-in-the-middle" (MITM) may sit between the tunnels' terminals and may function as an intermediary between the two TLS tunnels, and may apply logic to the (plaintext) information passing from one tunnel to the other. The MITM may, for example, inspect the plaintext of the HTTP communications, including the full URI. The plaintext URI may be compared to CTI to detect a potential attack.

There are some efficiency issues with the SSL/TLS proxy that the present disclosure addresses. One issue is that SSL/TLS proxies are computer-resource intensive, in comparison to intermediary functions that do not decrypt and re-encrypt TLS-secured communications. If sufficient computer resources are not available, then network performance may be adversely affected to the point of degrading end-user experience. Conversely, sufficient computer resources and proxy management costs may be financially expensive—for both capital expenditures (CAPEX) and operating expenditures (OPEX)—relative to budget; thus, unless there is a compelling reason or requirement to use an SSL/TLS proxy, then organizations may choose not to use them.

Another issue may be that after the proxy tunnels and MITM are set up, the decrypt/re-encrypt process continues for the entire session, i.e., there may be no way to stop the decrypt/re-encrypt process without stopping the communications—even after it may have been determined that the proxy is no longer needed to read the communications' plaintext. Another issue may be that for some applications or policies, including cybersecurity and privacy protection, often only a relatively small percentage of the SSL/TLS-tunneled traffic needs to be decrypted into plaintext; but, because there may be no native mechanism for these applications and policies to selectively decrypt only relevant sessions, then significant inefficiencies may result. For example, a cybersecurity application may only be interested in the plaintext of HTTPS sessions for which the underlying HTTP is accessing a particular URI or URIs; but because the URI may not be sent in plaintext during an HTTPS session, then to determine if or when an HTTPS session may be accessing a particular URI may require decryption of the HTTPS session.

The present disclosure describes techniques for selectively decrypting SSL/TLS-secured sessions, such as an HTTPS session, when the selection criteria are FQDNs for hosts (e.g., "www.abc123.com") and URIs (e.g., https://www.abc123.com/path-segment-1/path-segment-2/resource). The utility of the techniques comes because for HTTPS sessions, when the TLS-tunneled HTTP session is sending HTTP messages containing hosts' FQDNs and URIs, these HTTP messages are encrypted; thus, the selection criteria—the hosts' FQDNs and the URIs—cannot be read in plaintext by an observer outside the tunnel.

FIG. 1 depicts a flowchart that illustrates a method of selectively decrypting SSL/TLS communications, in accordance with one or more example embodiments. As seen in FIG. 1, one or more steps of the depicted example flowchart and other similar examples described herein may be performed in a computing environment such as the system illustrated in FIG. 2, as well as other systems having different architectures (e.g., FIG. 3). In other embodiments, the method illustrated in FIG. 1 and/or one or more steps thereof may be embodied in a computer-readable medium, such as a non-transitory computer readable memory.

Referring to FIG. 1, at Step 1-1, according to one or more embodiments described herein, an efficient SSL/TLS proxy ("E-PROXY") may construct lists of identification data. The E-PROXY may be configured to construct a first list, called the "URI-decrypt-list", of URIs that, for any HTTPS sessions connecting with a URI address in the URI-decrypt-list, the HTTPS session will be decrypted. The E-PROXY may also construct a second list, called the "domain-name-decrypt-list", of domain names and hosts' FQDNs that, for any HTTPS sessions connecting with a host whose name is in the domain-name-decrypt-list, the HTTPS session will be decrypted, while HTTPS sessions with hosts that are not in the domain-name-decrypt-list will not be decrypted.

In Step 1-2, and for each URI in the URI-decrypt-list, the E-PROXY may extract the host name value, which may comprise an FQDN or an IP address, in the URI, and add the extracted name values to the domain-name-decrypt-list. E-PROXY may be further configured to remove duplicates from the domain-name-decrypt-list. Alternatively or additionally, E-PROXY may prevent adding a duplicate host name value identifier to the domain-name-decrypt list. The domain-name-decrypt-list may contain IP addresses, but in some embodiments the list may comprise domain names and FQDNs to indicate hosts.

In Step 1-3, E-PROXY may provide the domain-name-decrypt-list to its "man-in-the-middle" (MITM), an agent device that observes, and may act upon, all network traffic on a link that will transport HTTPS sessions between endpoints, which may comprise HTTPS clients and HTTPS servers. In Step 1-4, for each TLS tunnel setup, or TLS handshake, session transported by the link, the MITM agent may inspect the value of the Server Name Indication (SNI) field—which may correspond to the FQDN of the destination HTTPS server—contained in the (plaintext) ClientHello message sent by the HTTPS client to the HTTPS server; and, from the subsequent (plaintext) Certificate message sent by the HTTPS server to the HTTPS client, may inspect the value of the server certificate's Subject:CN (Common Name) field—which is also the FQDN of the HTTPS server. Note that the SNI value should, but not necessarily, match the Subject:CN value. In one or more embodiments/examples/scenarios, the SNI value and the CN value may match. In such embodiments, the MITM agent may be configured to proceed with the TLS session. In other embodiments, the SNI value and the CN value may not match, and the MITM agent may be configured to choose the CN value for determining selective encryption, because it is reliably the FQDN of the server for the HTTPS session, whereas the SNI value is not reliable; or alternatively, the MITM agent may alert the anomaly but proceed with the TLS session, or may alert the anomaly and terminate the TLS session.

Also in Step 1-4, the MITM agent may compare the server's FQDN value to the elements in the domain-name-decrypt-list. If or when there is not a match or sufficient correspondence, then in Step 1-5a the MITM agent may take no action to decrypt the session, thereby saving computational resources and possibly enforcing policies, such as privacy protection policies. If or when there is a match or sufficient correspondence, then in Step 1-5b the agent may set up and use an SSL/TLS proxy function to (a) decrypt the HTTPS session; and (b) inspect the plaintext of the HTTPS session. Before applying any intermediating logic to the plaintext, the MITM agent checks if the session's domain name value was inserted into the domain-name-decrypt-list because it was a host name extracted from the URI-decrypt-list. If so, then the agent compares the session's URI value to elements in the URI-decrypt-list. If there is not a match or sufficient correspondence, then in Step 1-6a, the agent may re-encrypt the session and forward to the destination without applying any intermediating logic to the session's plaintext. If there is a match, or if the session's domain name was not generated from the URI-decrypt-list, then in Step 1-6*b* the agent may apply some intermediating logic to the session's plaintext. The intermediating logic may, for example, take some action on the session specified by a higher-level application (e.g., cybersecurity, privacy protection, law enforcement), such as blocking the communication; or allowing the communication to proceed but logging and capturing the plaintext packets composing the communication; or applying some transformation to the plaintext. If the communication is not blocked by the intermediating logic, then the plaintext packets are re-encrypted and forwarded to the destination.

Note that if the process of FIG. 1 proceeds to Step 1-5*b* and decrypts the session, but then proceeds to Step 1-6*a* because the session's URI does not match an element in the URI-decrypt-list, then the session was unnecessarily decrypted. However, there are still efficiencies gained because Step 1-6*a* skips the application of any intermediating logic as occurs in Step 1-6*b*. Furthermore, there is a non-zero probability that in Step 1-5*b* the URIs will match, and then the process will proceed to Step 1-6*b*; in which case the decryption was necessary. Thus, despite the possible unnecessary decryption that may occur in Step 1-5*b*, the overall process, when applied continually to all TLS sessions in a typical, practical computing environment, is deterministically more efficient.

Additionally or alternatively, instead of a domain-name-decrypt-list, a domain-name-do-not-decrypt-list may be used by the agent to selectively not decrypt HTTPS sessions, if the host's FQDN associated with an HTTPS session is included in the domain-name-do-not-decrypt-list. Or, both types of lists may be used simultaneously, with one list given priority over the other list. This situation may arise when different applications or policies are generating the lists, for example, the domain-name-decrypt-list may be generated by cybersecurity applications and policies, and the domain-name-do-not-decrypt-list may be generated by privacy protection applications and policies.

Figure 2:
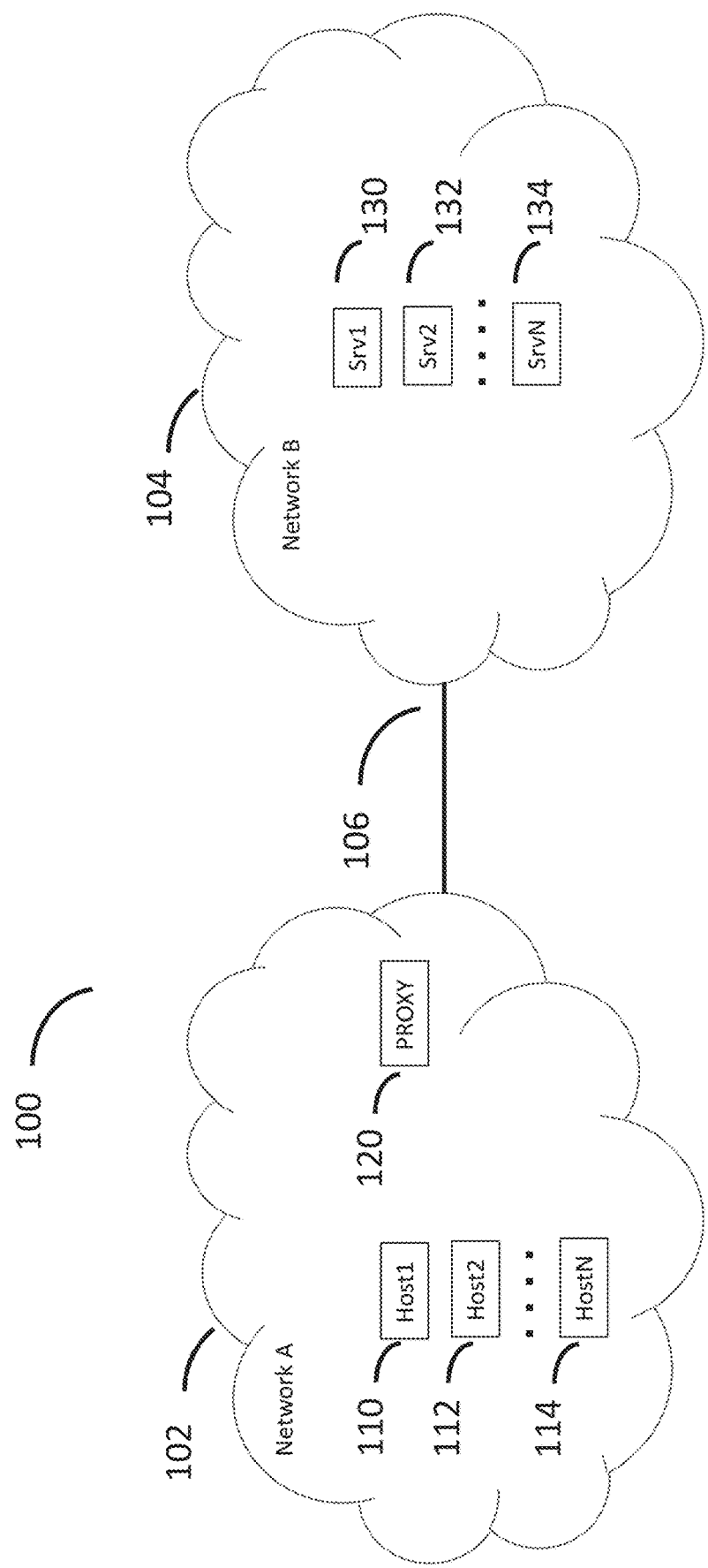
FIG. 2 depicts an illustrative environment for an efficient SSL/TLS proxy that selectively decrypts encrypted communications in accordance with one or more aspects of the disclosure.

FIG. 2 depicts an illustrative environment for an efficient SSL/TLS proxy that selectively decrypts encrypted communications, in accordance with one or more aspects of the disclosure. Referring to FIG. 2, environment 100 may include Network A 102 and Network B 104, which may be connected by a network link 106 providing internetwork access/interconnect. Network A 102 may comprise one or more networks (e.g., Local Area Networks (LANs), Wide Area Networks (WANs), Virtual Private Networks (VPNs), Software-Defined Networks (SDNs), or combinations thereof) associated with one or more individuals or entities (e.g., governments, corporations, service providers, or other organizations). Network B 104 may comprise one or more networks (e.g., LANs, WANs, VPNs, SDNs, or combinations thereof) that interface Network A 102 with one or more other networks (not illustrated). For example, Network B 104 may comprise the Internet, or a similar network, or portions thereof.

Environment 100 may also include one or more hosts, such as computing or network devices (e.g., servers, desktop computers, laptop computers, tablet computers, mobile devices, smartphones, routers, gateways, proxies, firewalls, switches, access points, or the like). For example, network 102 may include hosts 110, 112, and 114, which may be configured to function as clients; proxy devices 120; and network 104 may include hosts 130, 132, and 134, which may be configured to function as servers. As used herein, "host" (or "hosts") refers to any type of network device (or node) or computing device; while such devices may be assigned (or configured to be assigned) one or more network-layer addresses, the term "host" (or "hosts") does not imply such devices necessarily are assigned (or configured to be assigned) one or more network-layer addresses.

PROXY 120 may be located at or near a network border and a network link 106 between networks 102 and 104 and may interface network 102 or one or more hosts located therein with network 104 or one or more hosts located therein. For example, network 104 may include hosts 130, 132, and 134 which may be hosting networked application servers (e.g., web servers); and network 102 may include hosts 110, 112, and 114 which may be hosting networked application clients (e.g., web browsers). Proxy 120 may act as an intermediating agent for networked applications' clients and servers, for example a web proxy that intermediates the HTTP sessions between web clients and web servers, or an SSL/TLS proxy that intermediates HTTPS sessions between web clients and web servers.

FIG. 3 depicts an illustrative efficient SSL/TLS proxy E-PROXY 120 for selective decryption of TLS-secured communications in accordance with one or more aspects of the disclosure. Referring to FIG. 3, proxy 120 may be located inline on network link 106 that connects network 102 and network 104. Proxy 120 may comprise one or more TCP agents (e.g., TCP-AGT1 121, and TCP-AGT2 122), one or more TLS agents (e.g., TLS-AGT1 123, and TLS-AGT2 124), a "man-in-the-middle" (MITM) intermediary MITM 125, a certificate authority CA 126, a list manager LST-MGR 128, a memory STORE 129, network interfaces NTKW I/F 127, and a data bus DATA-BUS 140 that interconnects the proxy's components. Proxy 120 may interface inline with network link 106 via network interfaces 127. Thus, IP packets comprising TLS-secured communications between endpoints attached to network 102 and network 104 may pass through the proxy 120. TCP agents 121 and 122 may terminate TCP connections, maintain TCP session state, and spoof TP-network endpoints. TCP agents 121 and 122 may also be configured to compute (locally unique) flow identifiers, maintain flow state information, send/receive messages to/from other proxy components, and route/switch messages to other proxy components. TCP agents 121 and 122 may store and retrieve state information and other information via the memory STORE 129. TLS agents TLS-AGT1 123 and TLS-AGT2 124 may terminate TLS tunnels, maintain TLS session state, and spoof TLS clients and servers. TLS agents 123 and 124 may also be configured to maintain TLS session state information, send/receive messages to/from other proxy components, and route/switch messages to other proxy components. TLS agents 123 and 124 may store and retrieve state information and other information via the memory store 129. TLS agents 123 and 124 may interact with certificate authority CA 126 to generate digital certificates, for example X.509 certificates, as needed, in accordance with one or more aspects of the disclosure.

The "man-in-the-middle" (MITM) intermediary agent MITM 125 may be configured to implement higher-level applications, such as cybersecurity applications, law enforcement applications, and privacy protection applications, that act on information in packets that have been decrypted by TLS agents 123 and 124; for example, a MITM agent 125 may copy packets and store them in memory store 129, may log packets and may store the logs in memory store 129, etc., in accordance with one or more requirements of the higher-level applications that are executing within the proxy 120. The MITM agent 125 may also be configured to signal message routing between proxy components in order to make the proxy operate efficiently, in accordance with one or more aspects of the disclosure. The MITM agent 125 may make and signal message routing decisions between proxy components based on information it receives from the list manager LST-MGR 128, by comparing IP addresses, domain names, and URIs associated with communications passing through the proxy with lists of IP addresses, domain names, and URIs created and maintained by the list manager 128.

FIG. 3 illustrates one example of a system architecture that may be used, and in some instances, the specific system architecture and computing devices used may vary, and are secondary to the functionality that they provide, but without departing from the scope of the disclosure. For example, one or more of the computing devices may be distributed across a network, i.e., portions of the data bus DATA-BUS 140 may be a network. As another example, some components may be logically contained in another components, e.g., the TCP agents and TLS agents may be integrated into a single component. As yet another example, the memory STORE 129 may be composed of multiple subcomponents that may be shared by multiple computing devices or dedicated to a single computing device.

Figure 5A:
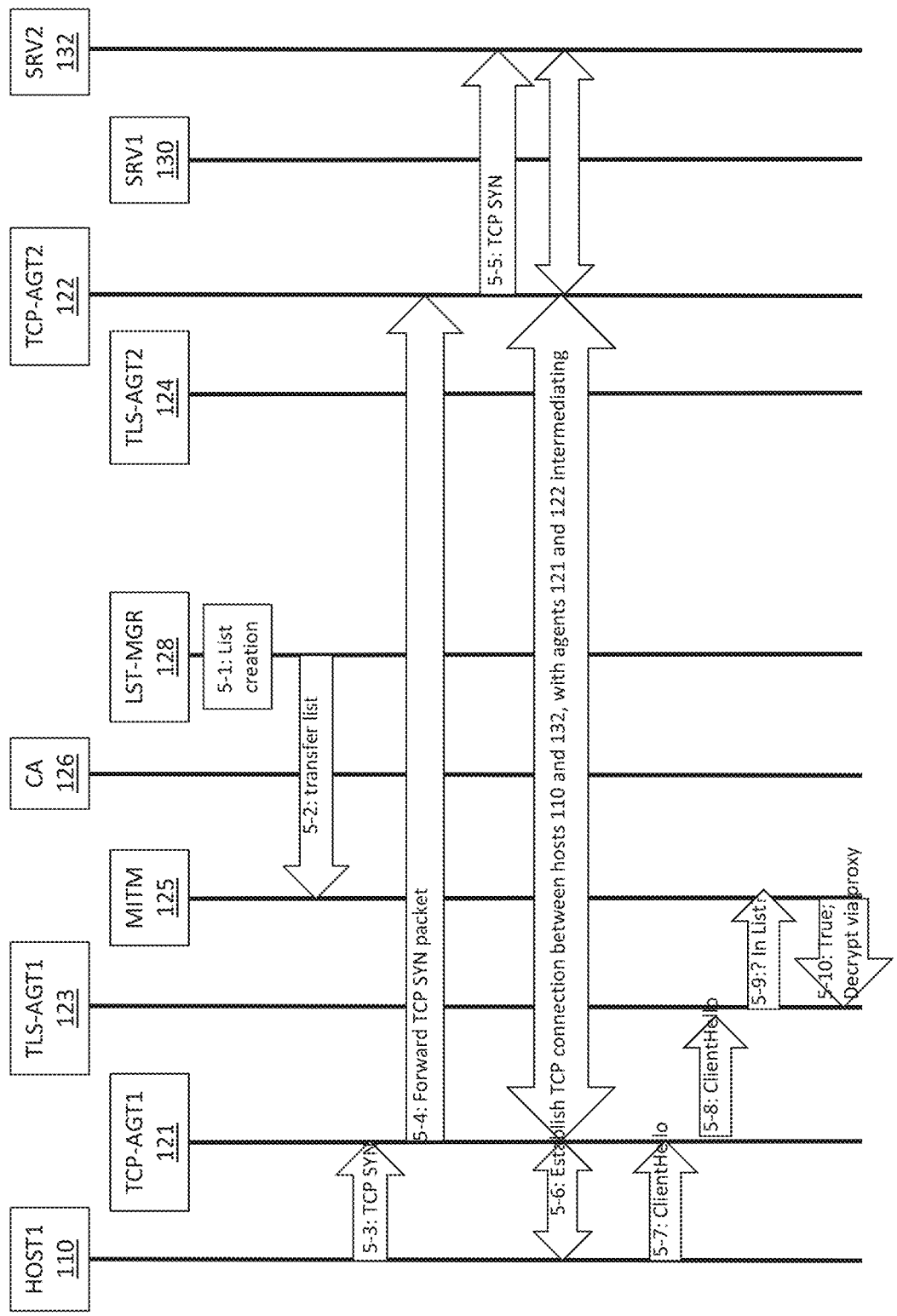
Figure 5B:
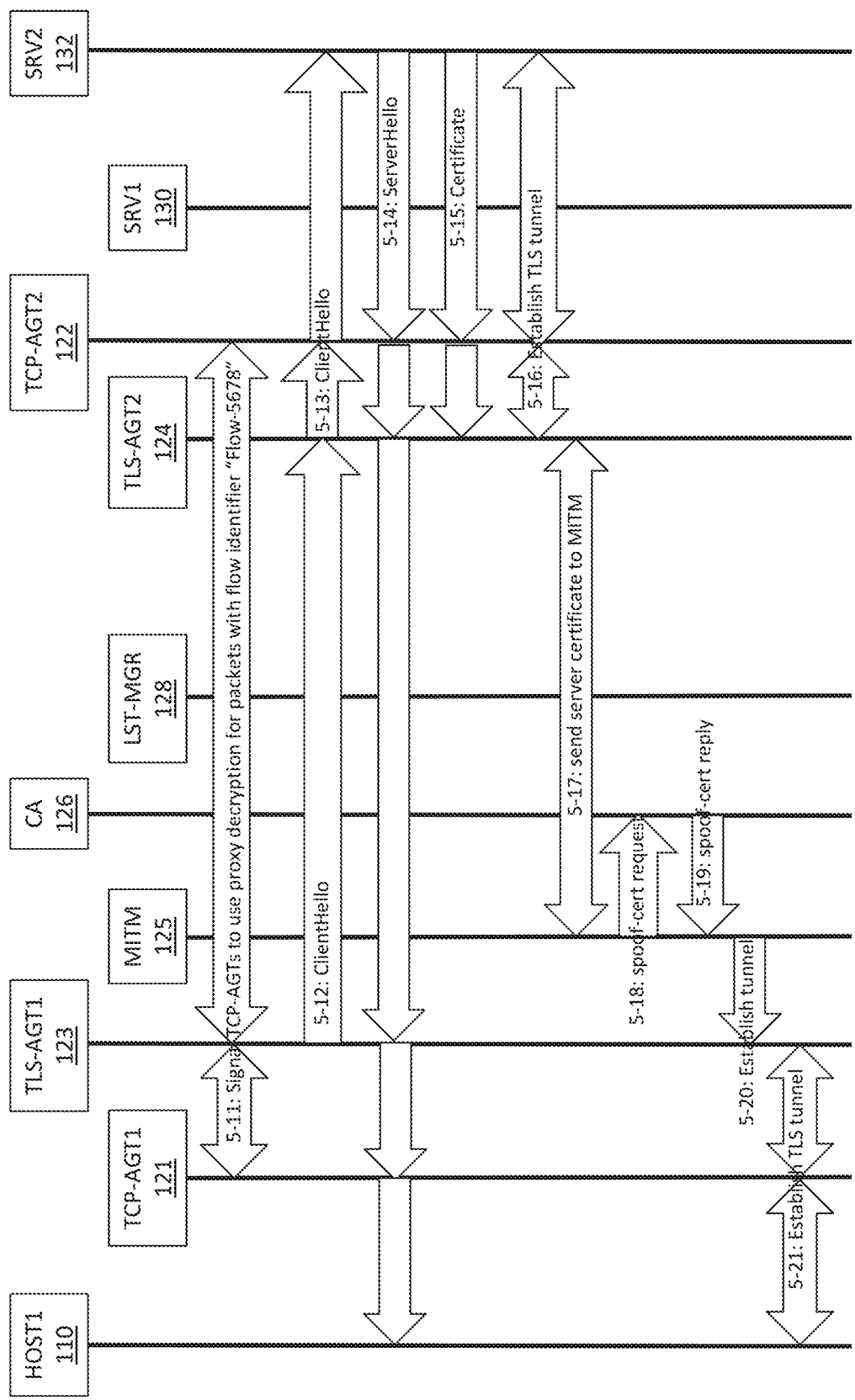
Figure 6:
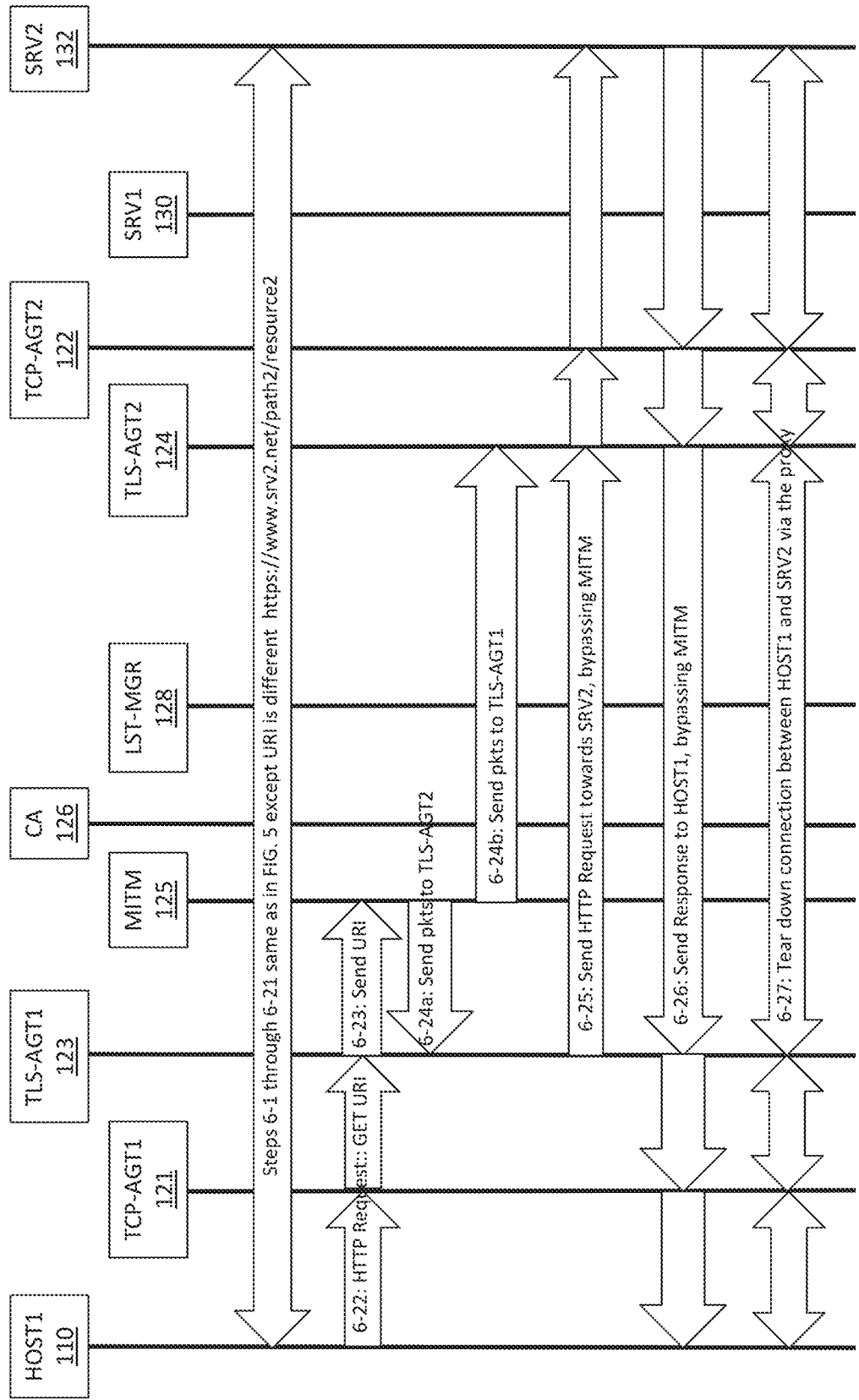

FIGS. 4, 5, and 6 depict illustrative event sequences for an efficient SSL/TLS proxy that selectively decrypts encrypted communications, in accordance with one or more aspects of the disclosure. The depicted steps are merely illustrative and may be omitted, combined, or performed in an order other than that depicted; the numbering of the steps is merely for ease of reference and does not imply any particular ordering is necessary or preferred. The TLS handshake process depicted is the basic handshake; other handshake message sequences are possible, but these do not affect the scope of the present disclosure. FIGS. 4, 5, and 6 depict an example embodiment in which the HTTPS protocol on port 443 is used, and the SSL/TLS proxy is transparent at network layer 3. In other words, the proxy components do not have IP addresses, nor do the proxy components alter the layer 3/IP-layer source and destination IP addresses and the protocol type, nor do they alter the layer 4/transport-layer source and destination ports. However, these constraints, instances, and assumptions are exemplary and do not limit the scope of the present disclosure, which may be applied to other TLS-secured protocols besides HTTPS and may be applied to non-transparent proxies in other similar embodiments.

Also, for simplicity of description, when reference is made to TLS handshake messages, such as ClientHello, being sent between components X and Y, this is a shorthand notation for "the one or more IP packets containing the TLS message ClientHello are sent from component X to component Y". Similarly, for HTTP messages, such as a GET method, as each HTTP message may be contained in one or more IP packets being sent between components.

Figure 4A:
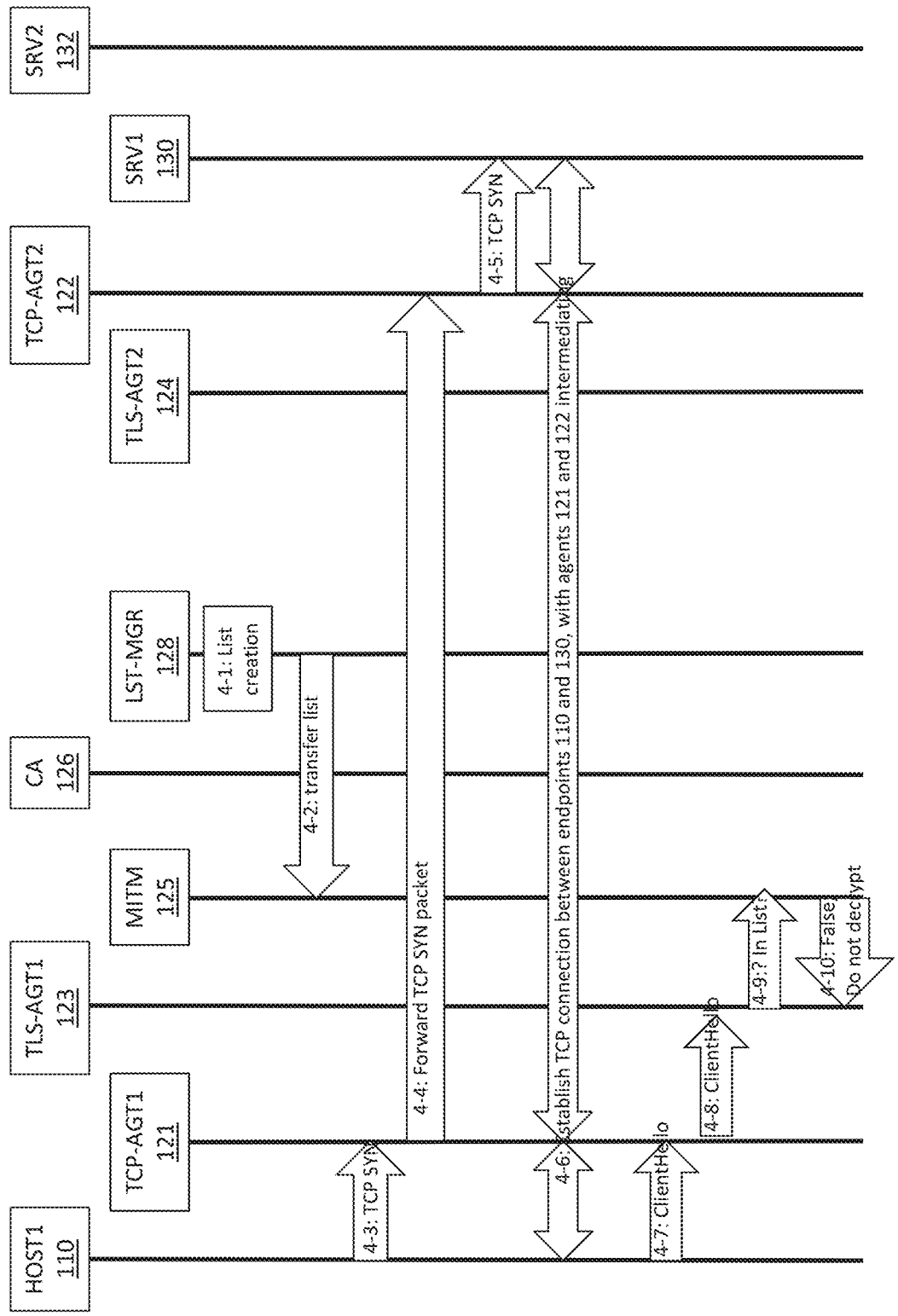
Figure 4B:
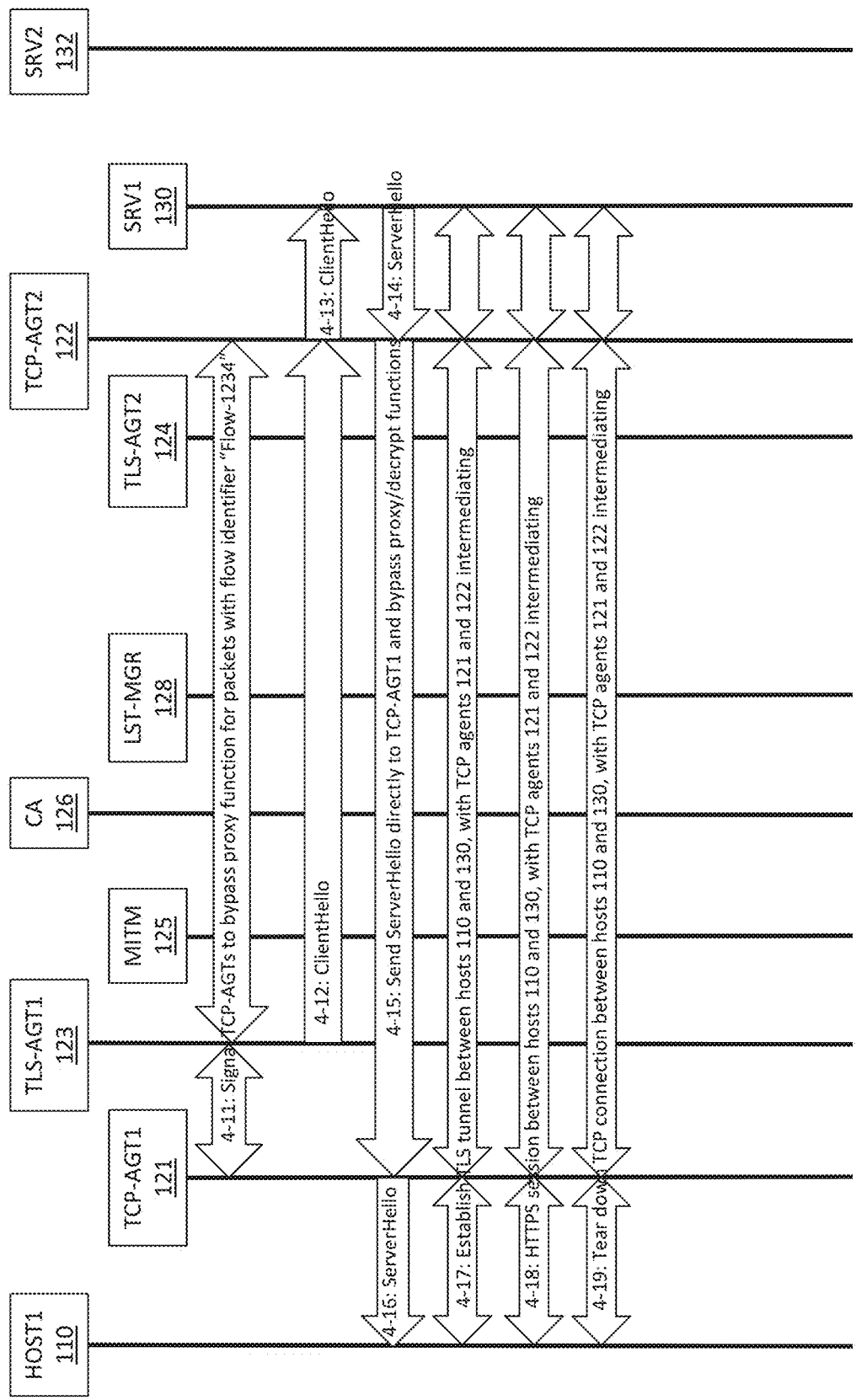

FIGS. 4A and 4B illustrate an embodiment in which the efficient SSL/TLS proxy determines to not decrypt an HTTPS session, based on the domain name of the HTTPS server. Referencing FIG. 4A, at Step 4-1, a domain-name-decrypt-list containing domain names is generated by a list manager LST-MGR 128. List generation may be performed, among others, via a user interface that accepts domain names, hosts' FQDNs, etc., as input, or via extraction of hosts' FQDNs from URIs supplied by threat intelligence providers via subscription services, or from domain names supplied by threat intelligence providers via subscription services, or via privacy protection data and policies, among others. At Step 4-2, the list manager LST-MGR 128 may transfer the domain-name-decrypt-list to the MITM 125. If or when the higher-level application that is using the efficient SSL/TLS proxy requests to compare the HTTPS sessions' URIs to a database of URIs, as may occur in, e.g., cybersecurity applications, then the list manager may also generate and send to the MITM 125 a URI-decrypt-list containing URIs which were used to derive some portion of the domain names in the domain-name-decrypt-list.

At Step 4-3, host HOST1 110 may initiate an HTTPS session with a web server SRV1 130 with a domain name, for example, "www.srv1.net," via a web browser (a web/HTTP(S) client) application by pointing a browser to a URI (e.g., "https://www.srv1.net/index.html"). HOST1 110 may resolve the domain name "www.srv1.net" to an IP address, for example, 1.2.3.4. In some embodiments HOST1 110 may resolve the domain name by checking a local cache. In other embodiments, HOST1 110 may query a Domain Name System (DNS) server (not shown in FIG. 4A).

To initiate the HTTPS session's communications with web server SRV1 130, at Step 4-3, HOST1 110 may initiate a TCP connection with web server SRV1 130 on port 443 by issuing a TCP SYN message, which may be intercepted by TCP-AGT1 121. TCP-AGT1 121 may locally compute (and may record in a lookup table) a (bi-directional) flow identifier "Flow-1234" for the TCP connection. For example, a flow identifier may comprise a hash of the packet's source and destination IP addresses, source and destination ports, IP protocol type, and possibly other information, as well as the current, or initial default, intra-proxy packet-forwarding action for packets associated with this HTTPS session. For packets transmitting in the direction of client-to-server, such as the TCP SYN packet initiating a new session, the initial default intra-proxy packet-forwarding action may be to forward the packet from TCP-AGT1 121 directly to TCP-AGT2 122, as shown in Step 4-4. TCP-AGT2 122 may compute and record the flow identifier "Flow-1234" and initial default intra-proxy packet-forwarding action (which is to forward packets transmitting in the direction of server-to-client from TCP-AGT2 122 directly to TCP-AGT1 121). At Step 4-5, TCP-AGT2 122 may forward the TCP SYN packet towards its destination of web server SRV1 130.

At Step 4-6, the multiple substeps of TCP packet transmissions that establish the TCP connection between host HOST1 110 and web server SRV1 130, with TCP-AGT1 121 and TCP-AGT2 122 intermediating, are shown in aggregate as bi-directional arrows between HOST1 110, TCP-AGT1 121, TCP-AGT 122, and SRV1 130.

The next few steps establish a TLS tunnel between HOST1 110 and SRV1 130, intermediated by the SSL/TLS proxy, during which a search is conducted on the domain-name-decrypt-list. At Step 4-7, HOST1 110 may send a TLS ClientHello message towards SRV1 130, which is intercepted by TCP-AGT1 121. Upon receiving the TLS ClientHello message (which initiates the TLS handshake/tunnel setup process), TCP-AGT1 121 may be configured to set its intra-proxy packet-forwarding action to forward client-to-server packets for this flow Flow-1234 to TLS-AGT1 123. At Step 4-8, TCP-AGT1 121 may send the TLS ClientHello message to TLS-AGT1 123.

In response to receipt of the one or more packets comprising the ClientHello message, in Step 4-9, TLS-AGT1 123 may compute and record a flow identifier value (e.g., "Flow-1234") and an initial default intra-proxy packet forwarding action, which may be to forward the ClientHello message directly to TLS-AGT2 124. TLS-AGT1 123 may extract a Server Name Indication (SNI) value from the ClientHello message. In some embodiments, the SNI value may not be available because the use of the SNI field by the browser/host (to signal the server as to which virtual domain is being requested) may be optional. In other embodiments, the SNI value may be incorrect or may have been manipulated by a malicious adversary. In any case, the certificate provided by the server SRV1 130 (www.srv1.net) in a subsequent step will have the actual server name (www.srv1.net) in the certificate's Subject:CN (Common Name) field, and can be used to verify (or not) that the SNI value is correct. Assume that the SNI value is being used and is correct, i.e., the value is www.srv1.net. At Step 4-9, TLS-AGT1 123 may send a query to MITM 125 to check if www.srv1.net is in the domain-name-decrypt-list. At Step 4-10, in response to receiving the query request of Step 4-9, MITM 125 may search the domain-name-decrypt-list, and based on the search, may determine that www.srv1.net is not in the list, and thus the session should not be decrypted, and may respond to the query with an indication that the requested domain was not found, which may signal TLS-AGT1 123 that www.srv1.net is not in the domain-name-decrypt-list, and therefore that the associated HTTPS session should not be decrypted by the proxy.

Referencing FIG. 4B, at Step 4-11, TLS-AGT1 123 may signal both TCP agents (e.g., TCP-AGT1 121 and TCP-AGT2 122) to send all (directional) intra-proxy packets corresponding to flow identifier "Flow-1234" directly to each other, that is, to bypass the proxy function. This step has the advantage of increasing the efficiency of the proxy, and reducing the processing load and the resource load on the proxy, by avoiding unnecessary decryption and re-encryption of communications. At Step 4-12, TLS-AGT1 123 may send the ClientHello message to TCP-AGT2 122. At Step 4-13, TCP-AGT2 122 may send the ClientHello message to its destination, the web server SRV1 130. At Step 4-14, SRV1 130 may respond to the ClientHello message with a TLS ServerHello message, which may be intercepted by TCP-AGT2 122. TCP-AGT2 122 may compute the packet's flow identifier "Flow-1234" and may look it up in store 129 (ref. FIG. 3) for the intra-proxy packet forwarding action, which is to send packets directly to TCP-AGT1 121, that is, to bypass the proxy function. At Step 4-15, TCP-AGT2 122 may send the ServerHello message directly to TCP-AGT1 121. At Step 4-16, TCP-AGT1 121 may send the ServerHello message to HOST1 110.

At Step 4-17, the multiple substeps of sending subsequent TLS handshake messages (Certificate, ServerKeyExchange, . . . , Finished) between host HOST1 110 and web server SRV1 130 that establish a TLS tunnel between HOST1 110 and SRV1 130, with TCP-AGT1 121 and TCP-AGT2 122 intermediating, are shown in aggregate as bi-directional arrows between HOST1 110, TCP-AGT1 121, TCP-AGT 122, and SRV1 130. The TLS messages referenced above may bypass the proxy functions, because this HTTPS session is not to be decrypted, as determined by the domain-name-decrypt-list (which does not include www.srv1.net).

Now that the TLS tunnel has been created with terminal points at HOST1 110 and SRV1 130, HOST1 110 and SRV1 130 may conduct an HTTP session, but each HTTP message is encrypted as it ingresses the TLS tunnel and decrypted as it egresses the tunnel, that is, an HTTPS session. Step 4-18 shows in aggregate the HTTPS session between HOST1 110 and SRV1 130, with TCP-AGT1 121 and TCP-AGT2 122 intermediating. If or when the HTTPS session is finished, the TCP connection between HOST1 110 and SRV1 130 may be torn down through a typical sequence of TCP signals (e.g., FIN, ACK turns). This is represented in aggregate at Step 4-19, with TCP-AGT1 121 and TCP-AGT2 122 intermediating.

FIGS. 5A, 5B, and 5C illustrate an embodiment in which the efficient SSL/TLS proxy may determine to decrypt an HTTPS session, based on the domain name of the HTTPS server. Upon decryption, it may be discovered that the session's URI matches a list of URIs managed by the MITM 125, and thus further processing will be performed on the decrypted packets composing the HTTPS session, in accordance with the logic of some high-level application using the efficient proxy—for example, a cybersecurity application—by passing those packets through the MITM 125.

For FIG. 5A, Steps 5-1 through 5-8 are similar to the corresponding Steps 4-1 through 4-8 in FIG. 4A, except the target HTTPS server is web server SRV2 132 instead of SRV1 130. Steps 5-1 and 5-2 in FIG. 5A are the same as Steps 4-1 and 4-2 in FIG. 4A.

Referencing FIG. 5A, host HOST1 110 may initiate an HTTPS session with a web server SRV2 132 with a domain name www.srv2.net via a web browser (a web/HTTP client) application by pointing the browser to the URI https://www.srv2.net/index.html. Host 110 resolves the domain name www.srv2.net to an IP address, for example, 5.6.7.8, either by checking a local DNS cache, or querying the Domain Name System (DNS), etc. (not shown in the diagram FIG. 5A).

To initiate the HTTPS session's communications with web server SRV2 132 www.srv2.net, at Step 5-3, HOST1 110 first initiates a TCP connection with web server SRV2 132 port 443 by issuing a TCP SYN message, which is intercepted by TCP-AGT1 121. TCP-AGT1 121 locally computes (and records in a lookup table) the (bi-directional) flow identifier "Flow-5678" for the TCP connection, for example, a hash of the packet's source and destination IP addresses, source and destination ports, and IP protocol type, as well as the current, or initial default, intra-proxy packet-forwarding action for packets associated with this HTTPS session. For packets transmitting in the direction of client-to-server, such as this TCP SYN packet initiating a new session, the initial default intra-proxy packet-forwarding action is to forward the packet from TCP-AGT1 121 directly to TCP-AGT2 122, which TCP-AGT1 121 does at Step 5-4. TCP-AGT2 similarly computes and records the flow identifier "Flow-5678" and initial default intra-proxy packet-forwarding action (which is to forward packets transmitting in the direction of server-to-client from TCP-AGT2 122 directly to TCP-AGT1 121). At Step 5-5, TCP-AGT2 122 forwards the TCP SYN packet towards its destination of web server SRV2 132.

At Step 5-6, the multiple substeps of TCP packet transmissions that establish the TCP connection between HOST1 110 and SRV2 132, with TCP-AGT1 121 and TCP-AGT2 122 intermediating, are shown in aggregate as bi-directional arrows between HOST1 110, TCP-AGT1 121, TCP-AGT 122, and SRV2 132.

The next few steps establish a TLS tunnel between HOST1 110 and SRV2 132, intermediated by the SSL/TLS proxy, during which a search is conducted on the domain-name-decrypt-list. At Step 5-7, host HOST1 110 may send a TLS ClientHello message towards web server SRV2 132, which is intercepted by TCP-AGT1 121. Upon receiving the TLS ClientHello message (which initiates the TLS handshake/tunnel setup process), TCP-AGT1 121 may be configured to set its intra-proxy packet-forwarding action to forward client-to-server packets to TLS-AGT1 123. At Step 5-8, TCP-AGT1 121 may send the packet containing the TLS ClientHello message to TLS-AGT1 123.

Upon receipt of the packet with the ClientHello message, TLS-AGT1 123 computes and records the flow identifier value "Flow-5678" and an initial default intra-proxy packet forwarding action, which may be to forward the ClientHello message directly to TLS-AGT2 124. First, however, TLS-AGT1 123 extracts the Server Name Indication (SNI) value from the ClientHello message, which is www.srv2.net. At Step 5-9, TLS-AGT1 123 sends a query to MITM 125 to check if www.srv2.net is in the domain-name-decrypt-list. MITM 125 searches domain-name-decrypt-list, and determines that www.srv2.net is in the list, and thus the subsequent HTTPS session should be decrypted by the proxy. At Step 5-10, MITM 125 responds "True" to the query by signaling TLS-AGT1 123 that www.srv2.net is in the domain-name-decrypt-list, and therefore that the associated HTTPS session should be decrypted by the proxy.

Referencing FIG. 5B, at Step 5-11, TLS-AGT1 123 signals both TCP agents TCP-AGT1 121 and TCP-AGT2 122 to, respectively, send all intra-proxy packets with flow identifier "Flow-5678" to, respectively, TLS-AGT1 123 and TLS-AGT2 124, in order to have the proxy decrypt the subsequent HTTPS session. At Step 5-12, TLS-AGT1 123 sends the ClientHello message to TLS-AGT2 124. Upon receiving the ClientHello message, TLS-AGT2 124 computes and records locally the flow identifier value "Flow-5678" and an initial default intra-proxy packet forwarding action, which is to forward packets directly to TLS-AGT1 123. At Step 5-13, TLS-AGT2 124 sends the ClientHello message to TCP-AGT2 122, which sends the ClientHello to the destination SRV2 132. At Step 5-14, SRV2 132 responds with a ServerHello message which is intercepted by TCP-AGT2 122, which sends the ServerHello message to TLS-AGT2 124, which sends the ServerHello message to TLS-AGT1 123, which sends the ServerHello message to TCP-AGT1 121, which sends the ServerHello message to HOST1 110.

In Steps 5-15 through 5-21, TLS tunnels may be established between TLS-AGT2 124 and SRV2 132, and between TLS-AGT1 123 and HOST1 110. In this embodiment, TLS-AGT2 124 may spoof HOST1 110 such that it may appear to SRV2 132 that it is directly interacting with HOST1 110 as both an IP-addressable endpoint and as the far-end terminal point of the TLS tunnel between HOST1 110 and SRV2 132; and similarly, TLS-AGT1 123 may spoof SRV2 132 such that it may appear to HOST1 110 that it is directly interacting with SRV2 132 as both an IP-addressable endpoint and as the far-end terminal point of the TLS tunnel between HOST1 110 and SRV2 132. Neither HOST1 110 nor SRV2 132 (respectively) may be aware that they are actually interacting with proxy components TLS-AGT1 123 and TLS-AGT2 124 (respectively). For simplicity of description, Steps 5-15 through 5-21 described below may use self-signed certificates; however, in common practice, a server certificate may not be self-signed—applications typically treat self-signed certificates as a security risk—but instead may be signed by the certificate authority that created the server certificate; and the certificate authority's certificate that was used to sign the server certificate will be included in the Certificate message, along with the server certificate, to form a chain of trust. In this respect, these assumptions, simplifications, and associated specifications are not intended to be limiting.

At Step 5-15, SRV2 132 may send a Certificate message, containing SRV2 132's server certificate, which may be intercepted by TCP-AGT2 122, which may send the Certificate message to TLS-AGT2 124. For simplicity of description, the server certificate may be self-signed, and the agents (e.g., a web browser on host 110, TLS agents 123 and 124, MITM 125) processing any self-signed certificates may not reject them or otherwise request intervention by other agents or users. Further assume that although in practice, an implementation will likely extract the server name (www.srv2.net) from the server certificate and compare it to the SNI value, or otherwise apply logic that acts on the server name for this session (because the server name contained in the Certificate is reliable), such as having the MITM check that the server name is in the domain-name-decrypt-list, for simplicity of description, such steps will not be described here. This does not limit the scope of the disclosure.

Upon receiving the Certificate message, TLS-AGT2 124 may proceed to establish a TLS tunnel with SRV2 132, while spoofing HOST1 110 (by using HOST1 110's IP address as the source IP address in the IP header of packets that TLS-AGT2 124 generates), and with TCP-AGT2 122 intermediating. At Step 5-16, TLS-AGT2 124 and SRV2 132 may establish a TLS tunnel. In one of many embodiments, the TLS tunnel may be established using the following sub-steps: SRV2 132 may send a ServerKeyExchange message to TLS-AGT2 124; SRV2 132 may send a ServerHelloDone message to TLS-AGT2 124; TLS-AGT2 124 may send a ClientKeyExchange message to SRV2 132; TLS-AGT2 124 may send a ChangeCipherSpec message to SRV2 132; TLS-AGT2 124 may send a Finished message to SRV2 132; SRV2 132 may send a ChangeCipherSpec message to TLS-AGT2 124; and SRV2 132 may send a Finished message to TLS-AGT2 124 (message sequence details are not shown in FIG. 5B).

Subsequently, a TLS tunnel may be established between TLS-AGT1 123 and HOST1 110, for which TLS-AGT1 123 spoofs SRV2 132, i.e., HOST1 110 believes it is directly interacting with SRV2 132 to establish the TLS tunnel but in fact is interacting with TLS-AGT1 123. First, however, the proxy needs to generate a new server certificate for SRV2 132 that TLS-AGT1 123 uses to establish the TLS tunnel with HOST1 110, as is standard operation for SSL/TLS proxies. (The server certificate provided by SRV2 132 may not simply be copied and re-used; one reason is that a private key known only to SRV2 132 is associated with its server certificate that is used to decrypt and encrypt messages. Without this key, TLS-AGT1 123 may not establish a TLS tunnel with HOST1 110 while using the server certificate of SRV2 132.)

At Step 5-17, TLS-AGT2 124 may send a copy of the server certificate to MITM 125. At Step 5-18, MITM 125 sends the server certificate to certificate authority CA 126, and requests a new certificate that spoofs SRV2 132's server certificate. At Step 5-19, CA 126 sends a new spoofed server certificate and other necessary information (e.g., a private key for the certificate) to MITM 125. At Step 5-20, MITM 125 sends the spoofed server certificate, and the associated information, to TLS-AGT1 123, along with an instruction to establish a TLS tunnel with HOST1 110. At Step 5-21, in a process similar to Step 5-16, TLS-AGT1 123 proceeds to establish a TLS tunnel with HOST1 110, while spoofing SRV2 132 (by using SRV2 132's IP address as the source IP address in the IP header of packets that TLS-AGT1 123 generates, and by using the spoofed server certificate generated by CA 126), and with TCP-AGT1 121 intermediating.

HOST1 110 now initiates an HTTP session with SRV2 132. All HTTP messages will be sent through the two TLS tunnels, with the proxy intermediating. Referring to FIG. 5C, at Step 5-22, HOST1 110 sends an HTTP request message with Request-Line "GET https://www.srv2.net/path1/resource1 HTTP/1.1" into the TLS tunnel, which encrypts the request upon tunnel ingress and decrypts the HTTP request message upon tunnel egress, where it is received by TLS-AGT1 123 (with TCP-AGT1 121 intermediating).

At Step 5-23, TLS-AGT1 123 extracts the URI https://www.srv2.net/path1/resource1 from the (plaintext) HTTP request message and sends it to MITM 125. Recall that at Step 5-2 of FIG. 5A, the MITM 125 stored a list of URIs "URI-decrypt-list" to compare with URIs used in HTTPS sessions, as may be done in a cybersecurity application, or privacy protection application, or a law-enforcement wiretapping application, or other applications that have logic that acts on the URI value of an HTTPS session. The MITM 125 compares the URI https://www.srv2.net/path1/resource1 to the entries in URI-decrypt-list. If there is a match or sufficient correspondence, then the MITM 125 may signal a high-level application (not shown in FIG. 5C) that is using the efficient SSL/TLS proxy. The high-level application may then execute additional logic. For example, a cybersecurity application or a law-enforcement wiretapping application may signal the MITM 125 to log and capture the decrypted packets composing the HTTPS session, for subsequent use by a cyberanalysis application which may assess the severity of the threat posed by the communications between HOST1 110 and the URI https://www.srv2.net/path1/resource1. Thus, the remainder of the session will pass all of the decrypted packets through the MITM 125. Accordingly, at Step 5-24a, MITM 125 signals TLS-AGT1 123 to send intra-proxy packets to MITM 125; and at Step 5-24b, MITM 125 signals TLS-AGT2 124 to send intra-proxy packets to MITM 125. At Step 5-25, TLS-AGT1 123 sends the (plaintext) HTTP request message to MITM 125, which may apply logic to the packet(s) according to the high-level application using the efficient proxy. At Step 5-26, MITM 125 sends the HTTP request message to TLS-AGT2 124, which sends the message into the TLS tunnel; then the (encrypted) message traverses the tunnel via TCP-AGT2 122 and egresses the tunnel at the destination endpoint SRV2 132. At Step 5-27, SRV2 132 generates a response to the HTTP request, and sends it into the tunnel towards HOST1 110 via TCP-AGT2 122, TLS-AGT2 124, MITM 125, TLS-AGT1 123, and TCP-AGT1 121. At Step 5-28, the HTTPS session may be terminated by tearing down the TCP connection between HOST1 110 and SRV1 132, which is transparently intermediated by the proxy's TCP-AGT1 121 and TCP-AGT2 122, using a typical sequence of TCP signals (e.g., FIN, ACK turns).

FIG. 6 depicts another embodiment similar to FIG. 5 except the session's URI does not match any element in URI-decrypt-list, and thus the remainder of the session does not pass through the MITM 125, which results in some efficiencies. Referring to FIG. 6, Steps 6-1 through 6-21 are the same as Steps 5-1 through 5-21 in FIG. 5 except the URI is https://www.srv2.net/path2/resource2 instead of https://www.srv2.net/path1/resource1. At Step 6-22, HOST1 110 sends an HTTP request message with Request-Line "GET https://www.srv2.net/path2/resource2 HTTP/1.1" into the TLS tunnel, which encrypts the request upon tunnel ingress and decrypts the request message upon tunnel egress, where it is received by TLS-AGT1 123 (with TCP-AGT1 121 intermediating).

At Step 6-23, TLS-AGT1 123 extracts the URI https://www.srv2.net/path2/resource2 from the HTTP request message and sends it to MITM 125. Recall that at Step 5-2 of FIG. 5A, which corresponds to Step 6-2 of FIG. 6, the MITM 125 stored a list of URIs "URI-decrypt-list" to compare with URIs used in HTTPS sessions, as may be done in a cybersecurity application, or privacy protection application, or other applications that have logic that acts on the URI value of an HTTPS session. The MITM 125 compares the URI https://www.srv2.net/path2/resource2 to the entries in URI-decrypt-list. The MITM 125 determines that there is not a match or sufficient correspondence; thus, at Step 6-24a, MITM 125 signals TLS-AGT1 123 to send intra-proxy packets directly to TLS-AGT2 124 (i.e., to bypass the MITM 125, because the higher-level application using the proxy is not interested in processing this session). Similarly, at Step 6-24b, MITM 125 signals TLS-AGT2 124 to send intra-proxy packets directly to TLS-AGT1 123 (i.e., to bypass the MITM 125, because the higher-level application using the proxy is not interested in processing this session). At Step 6-25, TLS-AGT1 123 sends the HTTP request message directly to TLS-AGT2 124 (bypassing the MITM 125); then TLS-AGT2 124 sends the HTTP request message into the TLS tunnel towards SRV2 132; then the message traverses the tunnel via TCP-AGT2 122 and egresses the tunnel at the destination endpoint SRV2 132. At Step 6-26, SRV2 132 generates a response to the HTTP request, and sends it towards HOST1 110 via TCP-AGT2 122, TLS-AGT2 124, TLS-AGT1 123, and TCP-AGT1 121 (again, bypassing the MITM 125). At Step 6-27, the HTTPS session may be terminated by tearing down the TCP connection between HOST1 110 and SRV1 132, which is transparently intermediated by the proxy's TCP-AGT1 121 and TCP-AGT2 122, using a typical sequence of TCP signals (e.g., FIN, ACK turns).

There is a variation on the above FIGS. 4, 5, and 6 that may broaden the scope of the disclosure. In Steps 4-1, 5-1, and 6-1 of respectively FIGS. 4A, 5A, and 6, a "domain-name-decrypt-list" containing domain names is created and eventually used to signal the efficient proxy to potentially decrypt packets in a session if the domain name of the session matches a domain name in the "domain-name-decrypt-list". Consider instead, or in addition to, the use of a "domain-name-do-not-decrypt-list", which may signal the efficient proxy to—not—decrypt packets in a session if the domain name of the session matches a domain name in the list. This may be more relevant to privacy applications in which certain communications should remain encrypted during transmission. Or, both types of lists may be used at the same time, with one list taking precedence over the other.

Another variation on the above FIG. 5 is when a match is found between a URI in the URI-decrypt-list and the URI of the session, the MITM may signal to end the session, for example, to prevent sensitive information from being communicated. This may be accomplished by, for example, terminating the TCP connection by generating a TCP RST signal and sending it to either the HOST1 110, or to SRV2 132, or both.

Another variation on FIG. 4 is to use a list of IP addresses "IP-address-decrypt-list" to determine whether or not to decrypt a given TLS-secured communication. Referencing FIG. 4A, at Step 4-1, an IP-address-decrypt-list containing IP addresses is generated by a list manager 128. List generation may be via a user interface that accepts IP addresses as input, or via resolving domain names using DNS, or via IP addresses supplied by threat intelligence providers via subscription services, or via privacy protection data and policies, etc. At Step 4-2, the list manager LST-MGR 128 transfers the IP-address-decrypt-list to the MITM 125. Steps 4-3 through 4-8 are the same as above (although at Step 4-8, extraction of the SNI value contained in the ClientHello message may be omitted). At Step 4-9, TLS-AGT1 123 extracts the source IP address and/or the destination IP address from the header of the IP packet that contains the ClientHello message, then sends a query to MITM 125 to check if the IP addresses are in the IP-address-decrypt-list. MITM 125 searches the IP-address-decrypt-list, and determines that the IP addresses are not in the list, and thus the session should not be decrypted. At Step 4-10, MITM 125 responds "False" to the query, which signals TLS-AGT1 123 that the IP addresses are not in the IP-address-decrypt-list, and therefore that the associated HTTPS session should not be decrypted by the proxy. Referencing FIG. 4B, Steps 4-11 through 4-19 proceed as above, i.e., the session bypasses the proxy decryption.

As a variation on the variation immediately above, if in Step 4-9 of FIG. 4A the MITM 125 searches the IP-address-decrypt-list, and determines that the IP addresses are in the list, then the session is to be decrypted. In that case, the process proceeds similarly as Steps 5-10 through 5-28 in FIG. 5.

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data-processing device. The computer-executable instructions may be stored on a computer-readable medium such as a hard disk, optical disk, removable storage media, solid-state memory, RAM, etc. As will be appreciated, the functionality of the program modules may be combined or distributed as desired. In addition, the functionality may be embodied in whole or in part in firmware or hardware equivalents, such as integrated circuits, application-specific integrated circuits (ASICs), field-programmable gate arrays (FPGA), and the like. Particular data structures may be used to more effectively implement one or more aspects of the disclosure, and such data structures are contemplated to be within the scope of computer-executable instructions and computer-usable data described herein.

Although not required, one of ordinary skill in the art will appreciate that various aspects described herein may be embodied as a method, system, apparatus, or one or more computer-readable media storing computer-executable instructions. Accordingly, aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing devices and networks. The functionality may be distributed in any manner or may be located in a single computing device (e.g., a server, client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order and that one or more illustrated steps may be optional. Any and all features in the following claims may be combined or rearranged in any way possible.

What is claimed is:

1. A method comprising:
   receiving, by a computing device, one or more first packets initiating a first encrypted communication flow;
   adding, by the computing device and based on determining that the one or more first packets satisfy domain name criteria, first identification data corresponding to the first encrypted communication flow to a first list indicating packet flows to be decrypted and processed using intermediating logic;
   receiving, by the computing device, one or more second packets;
   based on determining that the one or more second packets are part of the first encrypted communication flow initiated by the one or more first packets, and based on determining that the first encrypted communication flow corresponds to the first identification data added to the first list, decrypting the one or more second packets;
   applying the intermediating logic by processing plaintext of the decrypted one or more second packets and performing a corresponding action associated with the first encrypted communication flow on the decrypted one or more second packetsm wherein the corresponding action comprises one or more of;
   dropping subsequent packets of the first encrypted communication flow;
   logging one or more of the decrypted one or more second packets;
   capturing at least a portion of the decrypted one or more second packet; or
   applying a transformation to the plaintext of the decrypted one or more second packets;
   re-encrypting after performing the corresponding action, at least one of the decrypted one or more second packets; and
   transmitting the re-encrypted at least one of the one or more second packets to its intended destination.

2. The method of claim 1, wherein performing the corresponding action on the decrypted one or more second packets comprises:
   dropping the subsequent packets of the first encrypted communication flow.

3. The method of claim 1, further comprising:
   receiving, by the computing device, a second list comprising
   Uniform Resource Identifiers (URIs),
   wherein the domain name criteria comprises a host name value extracted from the second list.

4. The method of claim 3, further comprising:
   receiving, by the computing device, a third list comprising one or more of:
   one or more second domain names, or
   one or more URIs; and
   assigning a first priority to the second list and a second priority to the third list, wherein the first priority is different from the second priority, and wherein the first list is generated further based on the third list, the first priority, and the second priority.

5. The method of claim 3, wherein the second list is received from at least one of:
   a security application,
   one or more cyber threat intelligence providers,
   a privacy protection application, or
   a law-enforcement wiretapping application.

6. The method of claim 3, wherein the second list is generated based on Fully Qualified Domain Names (FQDN).

7. The method of claim 1, further comprising:
receiving one or more third packets initiating a second encrypted communication flow; and
forwarding, by the computing device and based on determining that the second encrypted communication flow is not indicated in the first list, a plurality of packets associated with the second encrypted communication flow to their intended destinations, wherein the plurality of packets are not decrypted prior to the forwarding.

8. The method of claim 1, wherein the performing the corresponding action associated with the first encrypted communication flow on the decrypted one or more second packets comprises:
logging the one or more of the decrypted one or more second packets.

9. The method of claim 1, wherein re-encrypting the at least one of the decrypted one or more second packets comprises:
re-encrypting each of the decrypted one or more second packets.

10. The method of claim 1, wherein performing the corresponding action associated with the first encrypted communication flow on the decrypted one or more second packets comprises:
capturing the at least a portion of the decrypted one or more second packets.

11. The method of claim 1, wherein the performing the corresponding action associated with the first encrypted communication flow on the decrypted one or more second packets comprises dropping a second packet of the one or more second packets, wherein the second packet of the one or more second packets is different from the at least one of the decrypted one or more second packets that is re-encrypted and transmitted.

12. The method of claim 1, wherein the first identification data comprises a five-tuple that identifies the first encrypted communication flow.

13. The method of claim 1, wherein the performing the corresponding action associated with the first encrypted communication flow on the decrypted one or more second packets comprises:
applying the transformation to the plaintext of the decrypted one or more second packets.

14. A computing device comprising:
one or more processors; and
memory storing instructions that, when executed by the one or more processors, cause the computing device to:
receive one or more first packets initiating a first encrypted communication flow;
add, based on determining that the one or more first packets satisfy domain name criteria, first identification data corresponding to the first encrypted communication flow to a first list indicating packet flows to be decrypted and processed using intermediating logic;
based on determining that the one or more second packets are part of the first encrypted communication flow initiated by the one or more first packets, and based on determining that the first encrypted communication flow corresponds to the first identification data added to the first list, decrypt the one or more second packets;
apply the intermediating logic by processing plaintext of the decrypted one or more second packets and perform a corresponding action associated with the first encrypted communication flow on the decrypted one or more second packets, wherein the corresponding action comprises one or more of:
dropping subsequent packets of the first encrypted communication flow;
logging one or more of the decrypted one or more second packets;
capturing at least a portion of the decrypted one or more second packets; or
applying a transformation to the plaintext of the decrypted one or more second packets;
re-encrypt, after performing the corresponding action, at least one of the decrypted one or more second packets; and
transmit the re-encrypted at least one of the one or more second packets to its intended destination.

15. The computing device of claim 14, wherein the instructions, when executed by the one or more processors, cause the computing device to re-encrypt each of the at least one of the decrypted one or more second packets by causing the computing device to:
re-encrypt each of the decrypted one or more second packets.

16. The computing device of claim 14, wherein the instructions, when executed by the one or more processors, cause the computing device to perform the corresponding action on the decrypted one or more second packets by causing the computing device to:
drop the subsequent packets of the first encrypted communication flow.

17. The computing device of claim 14, wherein the instructions, when executed by the one or more processors, further cause the computing device to:
receive
Uniform Resource Identifiers (URIs),
wherein the domain name criteria comprises a host name value extracted from the second list.

18. The computing device of claim 17, wherein the instructions, when executed by the one or more processors, further cause the computing device to:
receive a third list comprising one or more of:
one or more second domain names, or
one or more URIs; and
assign a first priority to the second list and a second priority to the third list, wherein the first priority is different from the second priority, and wherein the first list is generated further based on the third list, the first priority, and the second priority.

19. The computing device of claim 17, wherein the second list is generated based on Fully Qualified Domain Names (FQDN).

20. The computing device of claim 17, wherein the second list is received from at least one of:
a security application,
one or more cyber threat intelligence providers,
a privacy protection application, or
a law-enforcement wiretapping application.

21. The computing device of claim 14, wherein the instructions, when executed by the one or more processors, further cause the computing device to:
receive one or more third packets initiating a second encrypted communication flow; and
forward, based on determining that the second encrypted communication flow is not indicated in the first list, a plurality of packets associated with the second encrypted communication flow to their intended destinations, wherein the plurality of packets are not decrypted prior to the forwarding.

22. The computing device of claim 13, wherein the instructions, when executed by the one or more processors, further cause the computing device to perform the corresponding action associated with the first encrypted communication flow on the decrypted one or more second packets by causing the computing device to:
capture the at least a portion of the decrypted one or more second packets.

23. The computing device of claim 13, wherein the instructions, when executed by the one or more processors, cause the computing device to perform the corresponding action associated with the first encrypted communication flow on the decrypted one or more second packets by causing the computing device to:
log the one or more of the decrypted one or more second packets.

24. The computing device of claim 14, wherein the first identification data comprises a five-tuple that identifies the first encrypted communication flow.

25. The computing device of claim 14, wherein the instructions, when executed by the one or more processors, cause the computing device to perform the corresponding action associated with the first encrypted communication flow on the decrypted one or more second packets by causing the computing device to:
apply the transformation to the plaintext of the decrypted one or more second packets.

26. One or more non-transitory computer-readable media storing instructions that, when executed by one or more processors of a computing device, cause the computing device to:
receive one or more first packets initiating a first encrypted communication flow;
add, based on determining that the one or more first packets satisfy domain name criteria, first identification data corresponding to the first encrypted communication flow to a first list indicating packet flows to be decrypted and processed using intermediating logic;
receive one or more second packets;
based on determining that the one or more second packets are part of the first encrypted communication flow initiated by the one or more first packets, and based on determining that the first encrypted communication flow corresponds to the first identification data added to the first list, decrypt the one or more second packets;
apply the intermediating logic by processing plaintext of the decrypted one or more second packets and perform a corresponding action associated with the first encrypted communication flow on the decrypted one or more second packets, wherein the corresponding action comprises one or more of:
dropping subsequent packets of the first encrypted communication flow:
logging one or more of the decrypted one or more second packets;
capturing at least a portion of the decrypted one or more second packets; or applying a transformation to the plaintext of the decrypted one or more second packets;
re-encrypt, after performing the corresponding action, at least one of the decrypted one or more second packets; and
transmit the re-encrypted at least one of the one or more second packets to its intended destination.

27. The non-transitory computer-readable media of claim 26, wherein the instructions, when executed by the one or more processors, cause the computing device to re-encrypt the at least one of the decrypted one or more second packets by causing the computing device to:
re-encrypt each of the decrypted one or more second packets.

28. The non-transitory computer-readable media of claim 26, wherein the instructions, when executed by the one or more processors, cause the computing device to perform the corresponding action on the decrypted one or more second packets by causing the computing device to:
drop the subsequent packets of the first encrypted communication flow.

29. The non-transitory computer-readable media of claim 26, wherein the instructions, when executed by the one or more processors, further cause the computing device to:
receive, from a security application, a second list comprising
Uniform Resource Identifiers (URIs),
wherein the domain name criteria comprises a host name value extracted from the second list.

30. The non-transitory computer-readable media of claim 29, wherein the instructions, when executed by the one or more processors, further cause the computing device to:
receive a third list comprising one or more of:
one or more second domain names, or
one or more URIs; and
assign a first priority to the second list and a second priority to the third list, wherein the first priority is different from the second priority, and wherein the first list is generated further based on the third list, the first priority, and the second priority.

31. The non-transitory computer-readable media of claim 29, wherein the second list is received from at least one of:
a security application,
one or more cyber threat intelligence providers,
a privacy protection application, or
a law-enforcement wiretapping application.

32. The non-transitory computer-readable media of claim 29, wherein the second list is generated based on Fully Qualified Domain Names (FQDN).

33. The non-transitory computer-readable media of claim 26, wherein the instructions, when executed by the one or more processors, further cause the computing device to:
receive one or more third packets initiating a second encrypted communication flow; and
forward, based on determining that the second encrypted communication flow is not indicated in the first list, a plurality of packets associated with the second encrypted communication flow to their intended destinations, wherein the plurality of packets are not decrypted prior to the forwarding.

34. The non-transitory computer-readable media of claim 26, wherein the instructions, when executed by the one or more processors, further cause the computing device to perform the corresponding action associated with the first encrypted communication flow on the decrypted one or more second packets by causing the computing device to:
capture the at least a portion of the decrypted one or more second packets.

35. The non-transitory computer-readable media of claim 26, wherein the instructions, when executed by the one or more processors, cause the computing device to perform the corresponding action associated with the first encrypted communication flow on the decrypted one or more second packets by causing the computing device to:
log the one or more of the decrypted one or more second packets.

36. The non-transitory computer-readable media of claim 26, wherein the first identification data comprises a five-tuple that identifies the first encrypted communication flow.

37. The non-transitory computer-readable media of claim 26, wherein the instructions, when executed by the one or more processors, cause the computing device to perform the corresponding action associated with the first encrypted communication flow on the decrypted one or more second packets by causing the computing device to:
   apply the transformation to the plaintext of the decrypted one or more second packets.

* * * * *

UNITED STATES PATENT AND TRADEMARK OFFICE
CERTIFICATE OF CORRECTION

PATENT NO. : 12,034,710 B2
APPLICATION NO. : 17/556318
DATED : July 9, 2024
INVENTOR(S) : Sean Moore It is certified that error appears in the above-identified patent and that said Letters Patent is hereby corrected as shown below:

In the Claims

Column 18, Claim 1, Line 25:
Delete "packetsm" and insert --packets,-- therefor

Column 18, Claim 1, Line 26:
Delete "of;" and insert --of:-- therefor

Column 18, Claim 1, Line 32:
Delete "packet;" and insert --packets;-- therefor

Column 18, Claim 1, Line 35:
After "re-encrypting", insert --,--

Column 20, Claim 15, Line 20:
After "re-encrypt", delete "each of"

Column 20, Claim 17, Line 35:
After "receive", insert --a second list comprising--

Column 21, Claim 22, Line 3:
Delete "claim 13," and insert --claim 14,-- therefor Column 21, Claim 22, Line 5:
Before "cause", delete "further"

Column 21, Claim 23, Line 11:
Delete "claim 13," and insert --claim 14,-- therefor Signed and Sealed this
Third Day of December, 2024

Katherine Kelly Vidal
*Director of the United States Patent and Trademark Office*

CERTIFICATE OF CORRECTION (continued)
U.S. Pat. No. 12,034,710 B2

Column 21, Claim 26, Line 55:
Delete "flow:" and insert --flow;-- therefor

Column 21, Claim 26, Line 59:
After "or", insert --¶--

Column 22, Claim 34, Line 54:
Before "cause", delete "further"